United States Patent
Kamimura et al.

(10) Patent No.: US 10,235,164 B2
(45) Date of Patent: Mar. 19, 2019

(54) METHOD, STORAGE MEDIUM, AND APPARATUS

(71) Applicant: FUJITSU LIMITED, Kawasaki-shi, Kanagawa (JP)

(72) Inventors: Manabu Kamimura, Edogawa (JP); Akihiko Matsuo, Yokohama (JP); Yoshiharu Maeda, Inagi (JP); Yusuke Sasaki, Kawasaki (JP); Kiyoshi Nishikawa, Ebina (JP); Keisuke Yano, Kawasaki (JP); Koki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 15/040,295

(22) Filed: Feb. 10, 2016

(65) Prior Publication Data

US 2016/0291971 A1    Oct. 6, 2016

(30) Foreign Application Priority Data

Mar. 31, 2015    (JP) ................... 2015-072082

(51) Int. Cl.
*G06F 9/44* (2018.01)
*G06F 8/73* (2018.01)
*G06F 17/30* (2006.01)
*G06F 8/75* (2018.01)

(52) U.S. Cl.
CPC .............. *G06F 8/73* (2013.01); *G06F 8/75* (2013.01); *G06F 17/30616* (2013.01)

(58) Field of Classification Search
None
See application file for complete search history.

(56) References Cited

U.S. PATENT DOCUMENTS

| | | | | |
|---|---|---|---|---|
| 6,106,574 A | * | 8/2000 | Baisley | G06F 8/42 717/140 |
| 7,013,459 B2 | * | 3/2006 | Kuch | G06F 9/445 717/151 |
| 2005/0086647 A1 | * | 4/2005 | Ito | G06F 8/75 717/132 |
| 2009/0228794 A1 | | 9/2009 | Hasegawa et al. | |

FOREIGN PATENT DOCUMENTS

| | | |
|---|---|---|
| JP | 6-214772 | 8/1994 |
| JP | 2005-122407 | 5/2005 |
| JP | 2009-116638 | 5/2009 |
| JP | 2012-68946 | 4/2012 |
| JP | 2012-164148 | 8/2012 |

OTHER PUBLICATIONS

Huang et al., "Business Rule Extraction from Legacy Code", *COMPSAC '96 Proceedings of the 20th Conference on Computer Software and Applications*, 1996, pp. 162-167.

\* cited by examiner

*Primary Examiner* — Qamrun Nahar
(74) *Attorney, Agent, or Firm* — Staas & Halsey LLP

(57) ABSTRACT

A method includes: first identifying, from among one or more items included in a source code of a program, a first item used for storing data input to the program or data output by the program; associating, for each of predetermined ranges configuring the source code, an index value, based on a number of the first items referenced in the relevant predetermined range and the number of times the first item is referenced in the relevant predetermined range, with the relevant predetermined range; and outputting an association result of the index value for each of the predetermined ranges.

18 Claims, 28 Drawing Sheets

FIG. 4

```
000001 PROGRAM-ID.     TESTPG01.
000002 ENVIRONMENT DIVISION.
000003 INPUT-OUTPUT SECTION.
000004 FILE-CONTROL.
000005   SELECT URIAGE-OUTPUT ASSIGN TO URIAGEJ.
000006 DATA        DIVISION.
000007 FILE SECTION.
000008 FD URIAGE-OUTPUT
000009   BLOCK CONTAINS 0 RECORDS
000010   LABEL RECORD IS STANDARD.
000011 01 URIAGE-RECORD.
000012   03 FD-KAIINBANGO PIC 9(02).
000013   03 FD-KUBUN     PIC 9(02).
000014   03 FD-KINGAKU   PIC N(10).
000015 WORKING-STORAGE SECTION.
000016 01 WK-FLG.
000017   03 FLG         PIC 9(02).
000018 01 WK-IO.
000019   03 HINMEI      PIC X(10).
000020   03 KAKAKU      PIC 9(10).
000021   03 WK-ERR      PIC 9(02).
000022 LINKAGE SECTION.
000023 01 PG1INPUT.
000024   03 KUBUN1      PIC 9(02).
000025   03 HINMEI      PIC X(10).
000026   03 KAIINBANGO PIC 9(02).
000027   03 I-KOUNYUKAISU PIC 9(02).
000028 01 PG1OUTPUT.
000029   03 KUBUN2      PIC 9(02).
000030   03 KINGAKU     PIC 9(10).
000031   03 ERR-KUBUN1 PIC 9(02).
000032   03 O-KOUNYUKAISU PIC 9(02).
000033 PROCEDURE DIVISION USING PG1INPUT PG1OUTPUT.
000034   OPEN URIAGE-OUTPUT.
000035   MOVE ZERO TO ERR-KUBUN1.
000036   IF (KUBUN1 NOT = '00' AND '01' AND '02' AND '03')
000037     MOVE '01' TO ERR-KUBUN1
000038     GO TO PG-END
000039   END-IF.
000040   IF (KAIINBANGO NOT = '00')
000041     PERFORM SECTION01
000042   END-IF.
000043   STOP RUN.
000044
000045 SECTION SECTION01.
000046   EVALUATE KUBUN1
000047     WHEN '01'
000048       MOVE '10' TO KUBUN2
000049     WHEN '02'
000050       MOVE '20' TO KUBUN2
000051     WHEN '03'
000052       MOVE '30' TO KUBUN2
000053     WHEN OTHER
000054       MOVE '00' TO KUBUN2
000055   END-EVALUATE.
000056   MOVE HINMEI OF PG1INPUT TO HINMEI OF WK-IO.
000057   CALL "TESTSUB1" USING WK-IO.
000058   IF (WK-ERR NOT = 0)
000059     MOVE '03' TO ERR-KUBUN1
000060     MOVE 1 TO FLG
000061   END-IF.
000062   IF (FLG NOT = 0)
000063     GO TO PG-END
000064   END-IF.
000065   COMPUTE O-KOUNYUKAISU = I-KOUNYUKAISU + 1.
000066   MOVE KAIINBANGO TO FD-KAIINBANGO.
000067   WRITE URIAGE-RECORD
000068 PG-END.
```

| ITEM NAME | ITEM TYPE | INPUT-OUTPUT DETERMINATION |
|---|---|---|
| URIAGE-RECORD | GROUP ITEM (01) | ○ |
| FD-KAIINBANGO | ELEMENTARY ITEM PIC 9(02) | ○ |
| FD-KUBUN | ELEMENTARY ITEM PIC 9(02) | ○ |
| FD-KINGAKU | ELEMENTARY ITEM PIC 9(10) | ○ |

(2)

| ITEM NAME | ITEM TYPE | INPUT-OUTPUT DETERMINATION |
|---|---|---|
| PG1INPUT | GROUP ITEM (01) | ○ |
| KUBUN1 | ELEMENTARY ITEM PIC 9(02) | ○ |
| HINMEI | ELEMENTARY ITEM PIC X(10) | ○ |
| KAIINBANGO | ELEMENTARY ITEM PIC 9(02) | ○ |
| I-KOUNUKAISU | ELEMENTARY ITEM PIC 9(02) | ○ |
| PG1OUTPUT | GROUP ITEM (01) | ○ |
| KUBUN2 | ELEMENTARY ITEM PIC 9(02) | ○ |
| KINGAKU | ELEMENTARY ITEM PIC 9(10) | ○ |
| ERR-KUBUN1 | ELEMENTARY ITEM PIC 9(02) | ○ |
| O-KOUNUKAISU | ELEMENTARY ITEM PIC 9(02) | ○ |

(3)

| ITEM NAME | ITEM TYPE | INPUT-OUTPUT DETERMINATION |
|---|---|---|
| WK-FLG | GROUP ITEM (01) | × |
| FLG | ELEMENTARY ITEM PIC 9(01) | × |
| WK-IO | GROUP ITEM (01) | ○ |
| HINMEI | ELEMENTARY ITEM PIC X(10) | ○ |
| KAKAKU | ELEMENTARY ITEM PIC 9(10) | ○ |
| WK-ERR | ELEMENTARY ITEM PIC 9(02) | ○ |

FIG. 6A

```
0,URIAGE-RECORD,1,,URIAGE-RECORD,FileSection,1
0,FD-KAIINBANGO,3,9(02),FD-KAINBANGO OF URIAGE-RECORD,FileSection,1
0,FD-KUBUN,3,9(02),FD-KUBUN OF URIAGE-RECORD,FileSection,1
0,FD-KINGAKU,3,9(02),FD-KINGAKU OF URIAGE-RECORD,FileSection,1
```

FIG. 6B

```
0,PG1INPUT,1,,PG1INPUT,LinkageSection,1
0,KUBUN1,3,9(02),KUBUN1 OF PG1INPUT,LinkageSection,1
0,HINMEI,3,X(10),HINMEI OF PG1INPUT,LinkageSection,1
0,KAIINBANGO,3,9(02),KAIINBANGO OF PG1INPUT,LinkageSection,1
0,I-KOUNYUKAISU,3,9(02),I-KOUNYUKAISU OF PG1INPUT,LinkageSection,1
0,PG1OUTPUT,1,,PG1OUTPUT,LinkageSection,1
0,KUBUN2,3,9(02),KUBUN2 OF PG1OUTPUT,LinkageSection,1
0,KINGAKU,3,9(10),KINGAKU OF PG1OUTPUT,LinkageSection,1
0,ERR-KUBUN1,3,9(10),ERR-KUBUN1 OF PG1OUTPUT,LinkageSection,1
0,O-KOUNYUKAISU,3,9(02),O-KOUNYUKAISU OF PG1OUTPUT,LinkageSection,1
```

FIG. 6C

```
0,WK-FLG,1,,WK-FLG,WorkingSection,0
0,FLG,3,9(02),FLG OF WK-FLG,WorkingSection,0
0,WK-IO,1,,WK-IO,WorkingSection,1
0,HINMEI,3,X(10),HINMEI OF WK-IO,WorkingSection,1
0,KAKAKU,3,9(10),KAKAKU OF WK-IO,WorkingSection,1
0,WK-ERR,3,9(02),WK-ERR OF WK-IO,WorkingSection,1
```

FIG. 8A

RANGE OF PROGRAM

BIGIN: 33rd LINE
END: 68th LINE

FIG. 8B

RANGE OF SECTION

BIGIN: 33rd LINE
END: 44th LINE

BIGIN: 45rd LINE
END: 68th LINE

FIG. 8C

RANGE OF CONDITIONAL
STATEMENT

BIGIN: 36rd LINE
END: 39th LINE

BIGIN: 40rd LINE
END: 39th LINE

BIGIN: 46rd LINE
END: 55th LINE

BIGIN: 58rd LINE
END: 61th LINE

BIGIN: 62rd LINE
END: 64th LINE

| POINT | ITEM NAME | ITEM TYPE | INPUT-OUTPUT DETERMINATION |
|---|---|---|---|
| 0 POINT | URIAGE-RECORD | GROUP ITEM (01) | ○ |
| 0 POINT | FD-KAIINBANGO | ELEMENTARY ITEM PIC 9(02) | ○ |
| 0 POINT | FD-KUBUN | ELEMENTARY ITEM PIC 9(02) | ○ |
| 0 POINT | FD-KINGAKU | ELEMENTARY ITEM PIC 9(10) | ○ |

(2)

| POINT | ITEM NAME | ITEM TYPE | INPUT-OUTPUT DETERMINATION |
|---|---|---|---|
| 0 POINT | PG1INPUT | GROUP ITEM (01) | ○ |
| 2 POINTS | KUBUN1 | ELEMENTARY ITEM PIC 9(02) | ○ |
| 0 POINT | HINMEI | ELEMENTARY ITEM PIC X(10) | ○ |
| 2 POINTS | KAIINBANGO | ELEMENTARY ITEM PIC 9(02) | ○ |
| 0 POINT | I-KOUNYUKAISU | ELEMENTARY ITEM PIC 9(02) | ○ |
| 0 POINT | PG1OUTPUT | GROUP ITEM (01) | ○ |
| 0 POINT | KUBUN2 | ELEMENTARY ITEM PIC 9(02) | ○ |
| 0 POINT | KINGAKU | ELEMENTARY ITEM PIC 9(10) | ○ |
| 0 POINT | ERR-KUBUN1 | ELEMENTARY ITEM PIC 9(02) | ○ |
| 0 POINT | O-KOUNYUKAISU | ELEMENTARY ITEM PIC 9(02) | ○ |

(3)

| POINT | ITEM NAME | ITEM TYPE | INPUT-OUTPUT DETERMINATION |
|---|---|---|---|
| 0 POINT | WK-FLG | GROUP ITEM (01) | × |
| 0 POINT | FLG | ELEMENTARY ITEM PIC 9(01) | × |
| 2 POINTS | WK-IO | GROUP ITEM (01) | ○ |
| 0 POINT | HINMEI | ELEMENTARY ITEM PIC X(10) | ○ |
| 0 POINT | KAKAKU | ELEMENTARY ITEM PIC 9(10) | ○ |
| 2 POINTS | WK-ERR | ELEMENTARY ITEM PIC 9(02) | ○ |

| POINT | ITEM NAME | ITEM TYPE | INPUT-OUTPUT DETERMINATION |
|---|---|---|---|
| 0 POINT | URIAGE-RECORD | GROUP ITEM (01) | ○ |
| 0 POINT | FD-KAIINBANGO | ELEMENTARY ITEM PIC 9(02) | ○ |
| 0 POINT | FD-KUBUN | ELEMENTARY ITEM PIC 9(02) | ○ |
| 0 POINT | FD-KINGAKU | ELEMENTARY ITEM PIC 9(10) | ○ |

(2)

| POINT | ITEM NAME | ITEM TYPE | INPUT-OUTPUT DETERMINATION |
|---|---|---|---|
| 0 POINT | PG1INPUT | GROUP ITEM (01) | ○ |
| 0 POINT | KUBUN1 | ELEMENTARY ITEM PIC 9(02) | ○ |
| 0 POINT | HINMEI | ELEMENTARY ITEM PIC X(10) | ○ |
| 0 POINT | KAIINBANGO | ELEMENTARY ITEM PIC 9(02) | ○ |
| 2 POINTS | I-KOUNYUKAISU | ELEMENTARY ITEM PIC 9(02) | ○ |
| 0 POINT | PG1OUTPUT | GROUP ITEM (01) | ○ |
| 0 POINT | KUBUN2 | ELEMENTARY ITEM PIC 9(02) | ○ |
| 0 POINT | KINGAKU | ELEMENTARY ITEM PIC 9(10) | ○ |
| 0 POINT | ERR-KUBUN1 | ELEMENTARY ITEM PIC 9(02) | ○ |
| 2 POINTS | O-KOUNYUKAISU | ELEMENTARY ITEM PIC 9(02) | ○ |

(3)

| POINT | ITEM NAME | ITEM TYPE | INPUT-OUTPUT DETERMINATION |
|---|---|---|---|
| 0 POINT | WK-FLG | GROUP ITEM (01) | × |
| 0 POINT | FLG | ELEMENTARY ITEM PIC 9(01) | × |
| 0 POINT | WK-IO | GROUP ITEM (01) | ○ |
| 0 POINT | HINMEI | ELEMENTARY ITEM PIC X(10) | ○ |
| 0 POINT | KAKAKU | ELEMENTARY ITEM PIC 9(10) | ○ |
| 0 POINT | WK-ERR | ELEMENTARY ITEM PIC 9(02) | ○ |

| POINT | ITEM NAME | ITEM TYPE | INPUT-OUTPUT DETERMINATION |
|---|---|---|---|
| 0 POINT | URIAGE-RECORD | GROUP ITEM (01) | ○ |
| 0 POINT | FD-KAIINBANGO | ELEMENTARY ITEM PIC 9(02) | ○ |
| 0 POINT | FD-KUBUN | ELEMENTARY ITEM PIC 9(02) | ○ |
| 0 POINT | FD-KINGAKU | ELEMENTARY ITEM PIC 9(10) | ○ |

(2)

| POINT | ITEM NAME | ITEM TYPE | INPUT-OUTPUT DETERMINATION |
|---|---|---|---|
| 0 POINT | PG1INPUT | GROUP ITEM (01) | ○ |
| 14 POINTS | KUBUN1 | ELEMENTARY ITEM PIC 9(02) | ○ |
| 0 POINT | HINMEI | ELEMENTARY ITEM PIC X(10) | ○ |
| 2 POINTS | KAIINBANGO | ELEMENTARY ITEM PIC 9(02) | ○ |
| 0 POINT | I-KOUNYUKAISU | ELEMENTARY ITEM PIC 9(02) | ○ |
| 0 POINT | PG1OUTPUT | GROUP ITEM (01) | ○ |
| 0 POINT | KUBUN2 | ELEMENTARY ITEM PIC 9(02) | ○ |
| 0 POINT | KINGAKU | ELEMENTARY ITEM PIC 9(10) | ○ |
| 0 POINT | ERR-KUBUN1 | ELEMENTARY ITEM PIC 9(02) | ○ |
| 0 POINT | O-KOUNYUKAISU | ELEMENTARY ITEM PIC 9(02) | ○ |

(3)

| POINT | ITEM NAME | ITEM TYPE | INPUT-OUTPUT DETERMINATION |
|---|---|---|---|
| 0 POINT | WK-FLG | GROUP ITEM (01) | × |
| 0 POINT | FLG | ELEMENTARY ITEM PIC 9(01) | × |
| 2 POINTS | WK-IO | GROUP ITEM (01) | ○ |
| 0 POINT | HINMEI | ELEMENTARY ITEM PIC X(10) | ○ |
| 0 POINT | KAKAKU | ELEMENTARY ITEM PIC 9(10) | ○ |
| 2 POINTS | WK-ERR | ELEMENTARY ITEM PIC 9(02) | ○ |

FIG. 18

```
HINMEI
PRODUCT NAME
```

FIG. 19

1,TESTPG01,6,14,4,24
2,TESTPG02,4,2,4,10

| POINT | ITEM NAME | ITEM TYPE |
|---|---|---|
| 2 POINTS | KUBUN1 | ELEMENTARY ITEM PIC 9(02) |
| 2 POINTS | KAIINBANGO | ELEMENTARY ITEM PIC 9(02) |

(2)

| POINT | ITEM NAME | ITEM TYPE |
|---|---|---|
| 2 POINTS | KUBUN1 | ELEMENTARY ITEM PIC 9(02) |
| 2 POINTS | WK-ERR | ELEMENTARY ITEM PIC 9(02) |

FIG. 23

| POINT | ITEM NAME | ITEM TYPE |
|---|---|---|
| 2 POINTS | I-KOUNYUKAISU | ELEMENTARY ITEM PIC 9(02) |
| 2 POINTS | O-KOUNYUKAISU | ELEMENTARY ITEM PIC 9(02) |

| POINT | ITEM NAME | ITEM TYPE |
|---|---|---|
| 8 POINTS | KUBUN1 | ELEMENTARY ITEM PIC 9(02) |
| 2 POINTS | KAIINBANGO | ELEMENTARY ITEM PIC 9(02) |

(2)

| POINT | ITEM NAME | ITEM TYPE |
|---|---|---|
| 6 POINTS | KUBUN1 | ELEMENTARY ITEM PIC 9(02) |
| 2 POINTS | WK-ERR | ELEMENTARY ITEM PIC 9(02) |

FIG. 25

```
1,TESTPG01,SECTION01, 4,6,4,14
2,TESTPG01,,4,8,0,12
```

FIG. 26

(1)
| POINT | ITEM NAME | ITEM TYPE |
|---|---|---|
| 2 POINTS | KUBUN1 | ELEMENTARY ITEM PIC 9(02) |

(2)
| POINT | ITEM NAME | ITEM TYPE |
|---|---|---|
| 2 POINTS | KAIINBANGO | ELEMENTARY ITEM PIC 9(02) |

(3)
| POINT | ITEM NAME | ITEM TYPE |
|---|---|---|
| 2 POINTS | KUBUN1 | ELEMENTARY ITEM PIC 9(02) |

(4)
| POINT | ITEM NAME | ITEM TYPE |
|---|---|---|
| 2 POINTS | WK-ERR | ELEMENTARY ITEM PIC 9(02) |

| POINT | ITEM NAME | ITEM TYPE |
|---|---|---|
| 8 POINTS | KUBUN1 | ELEMENTARY ITEM PIC 9(02) |

(2)

| POINT | ITEM NAME | ITEM TYPE |
|---|---|---|
| 2 POINTS | KAIINBANGO | ELEMENTARY ITEM PIC 9(02) |

(3)

| POINT | ITEM NAME | ITEM TYPE |
|---|---|---|
| 6 POINTS | KUBUN1 | ELEMENTARY ITEM PIC 9(02) |

(4)

| POINT | ITEM NAME | ITEM TYPE |
|---|---|---|
| 2 POINTS | WK-ERR | ELEMENTARY ITEM PIC 9(02) |

FIG. 28

```
1,TESTPG01,36,IF,2,8,0,10
2,TESTPG01,46,EVALUATE,2,6,0,8
3,TESTPG01,40,IF,2,2,0,4
3,TESTPG01,58,IF,2,2,0,4
5TESTPG01,62,IF,0,0,0
```

METHOD, STORAGE MEDIUM, AND APPARATUS

CROSS-REFERENCE TO RELATED APPLICATION

This application is based upon and claims the benefit of priority of the prior Japanese Patent Application No. 2015-072082, filed on Mar. 31, 2015, the entire contents of which are incorporated herein by reference.

FIELD

The embodiment discussed herein is related to a method, a storage medium, and an apparatus.

BACKGROUND

In a computer system, if years have passed since the construction thereof, in some cases it becomes desirable to make improvements therein or to review the configuration of the entire system. In a case where an improvement, a review, or the like is made, a portion of an existing program is modified. Therefore, it becomes desirable to understand the specification of the existing system in some cases.

In a case of understanding the specification of the existing system, in particular, the specification of a business system implemented in order to automate some tasks of a business operation performed by a person, it is desirable to analyze a "business logic" so as to understand an implemented business operation performed by a person. The reason is that it is thought that, in order to cause a computer system to quickly keep pace with business changes, it is useful to understand the business logic so as to be ready to change the business logic.

As examples of the related art, Japanese Laid-open Patent Publication No. 2005-122407, Japanese Laid-open Patent Publication No. 2009-116638, Japanese Laid-open Patent Publication No. 6-214772, Japanese Laid-open Patent Publication No. 2012-68946, Japanese Patent No. 4820924, and H. Huang, W. T. Tsai, S. Bhattacharya, X. P. Chen, Y. Wang, J. Sun, "Business Rule Extraction from Legacy Code", COMPSAC '96 Proceedings of the 20th Conference on Computer Software and Applications, 1996 are known.

SUMMARY

According to an aspect of the invention, a method executed by a computer, the method includes: first identifying, from among one or more items included in a source code of a program, a first item used for storing data input to the program or data output by the program; associating, for each of predetermined ranges configuring the source code, an index value, based on a number of the first items referenced in the relevant predetermined range and the number of times the first item is referenced in the relevant predetermined range, with the relevant predetermined range; and outputting an association result of the index value for each of the predetermined ranges.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a source code of a program serving as an analysis target;

FIG. 5 illustrates an example of a configuration of input-output item information;

FIGS. 6A, 6B, and 6C each illustrate an example of input-output item information in CSV format;

FIGS. 8A, 8B, and 8C each illustrate an example of aggregate range information;

FIG. 13 illustrates an example of point information related to the business operation factor amount in a per-program aggregate range;

FIG. 14 illustrates an example of point information related to the business operation computational amount in a per-program aggregate range;

FIG. 16 illustrates an example of point information related to the business operation determination multiplicity in a per-program aggregate range;

FIG. 18 illustrates an example of specified business operation information;

FIG. 19 illustrates an example of a result of sorting, in descending order, total values of respective per-program aggregate ranges;

FIG. 22 illustrates an example of point information related to the business operation factor amount in a per-section aggregate range;

FIG. 23 illustrates an example of point information related to the business operation computational amount in a per-section aggregate range;

FIG. 24 illustrates an example of point information related to the business operation determination multiplicity in a per-section aggregate range;

FIG. 25 illustrates an example of a result of sorting, in descending order, total values of respective per-section aggregate ranges;

FIG. 26 illustrates an example of point information related to the business operation factor amount in a per-conditional-statement aggregate range;

FIG. 27 illustrates an example of point information related to the business operation determination multiplicity in a per-conditional-statement aggregate range; and FIG. 28 illustrates an example of a result of sorting, in descending order, total values of respective per-conditional-statement aggregate ranges.

DESCRIPTION OF EMBODIMENT

Not Only business logics are implemented into many business systems but also control logics used by systems to operate are mixed and implemented thereinto. The control logics are, for example, processing related to cooperation between applications, processing related to resource management, and so forth, which are not dedicated to business operations. Examples of these processing operations are processing operations independent from the business operations, such as checking of the format of data input by a screen and storing of the relevant data in a database.

Since a source code of a large-scale system is complex, it is not easy to find out a business logic from such a source code. In addition, in the large-scale system, the business logic itself is large in scale. Therefore, it is difficult to find out an important part in the business logic.

Therefore, in one aspect of the present embodiment, an object is to support identification of the most important part related to the business logic in a program.

Figure 1:
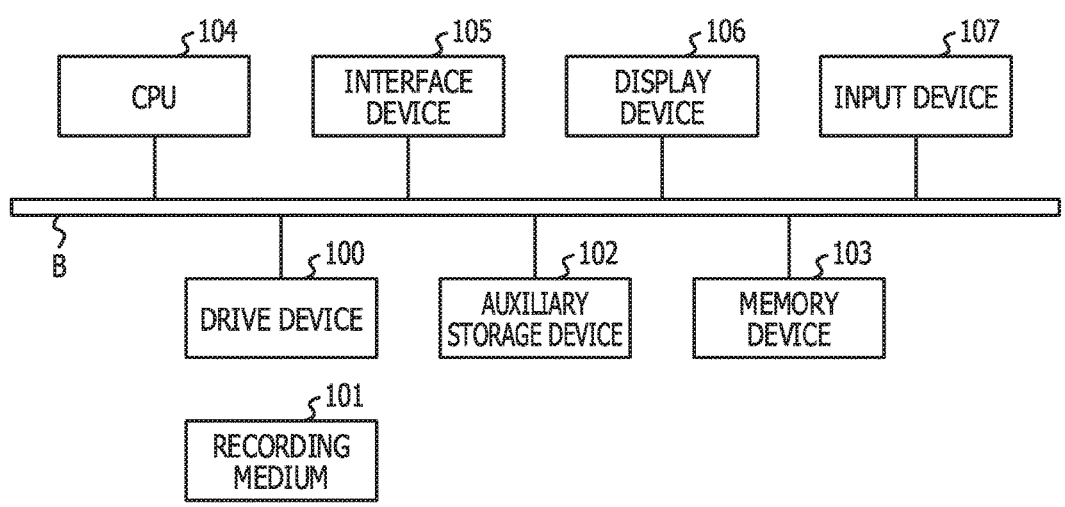
FIG. 1 illustrates an example of a hardware configuration of an analysis device in the present embodiment.

Hereinafter, the present embodiment will be described based on drawings. FIG. 1 illustrates an example of a hardware configuration of an analysis device in the present embodiment. An analysis device 10 in FIG. 1 includes a drive device 100, an auxiliary storage device 102, a memory device 103, a CPU 104, an interface device 105, a display device 106, an input device 107, and so forth, which are coupled to one another by a bus B.

A program for realizing processing in the analysis device 10 is provided by a recording medium 101. If the recording medium 101 in which the program is recorded is set on the drive device 100, the program is installed into the auxiliary storage device 102 from the recording medium 101 via the drive device 100. In this regard, however, the program does not have to be installed form the recording medium 101 and may be downloaded from another computer via a network and executed. The auxiliary storage device 102 stores therein the installed program and stores therein desirable files, desirable data, and so forth.

In a case where an activation instruction for the program is issued, the memory device 103 stores therein the program read from the auxiliary storage device 102. In accordance with the program stored in the memory device 103, the CPU 104 realizes functions according to the analysis device 10. The interface device 105 is used as an interface for being coupled to the network. The display device 106 displays graphical user interfaces (GUIs) or the like based on the program. The input device 107 corresponds to a keyboard, a mouse, and so forth and is used for inputting various operation instructions.

Note that, in the present embodiment, a portable recording medium such as a CD-ROM, a DVD disk, or a USB memory is an example of the recording medium 101. In addition, in the present embodiment, a hard disk drive (HDD), a flash memory, or the like is an example of the auxiliary storage device 102. The recording medium 101 and the auxiliary storage device 102 each correspond to a computer-readable recording medium.

Figure 2:
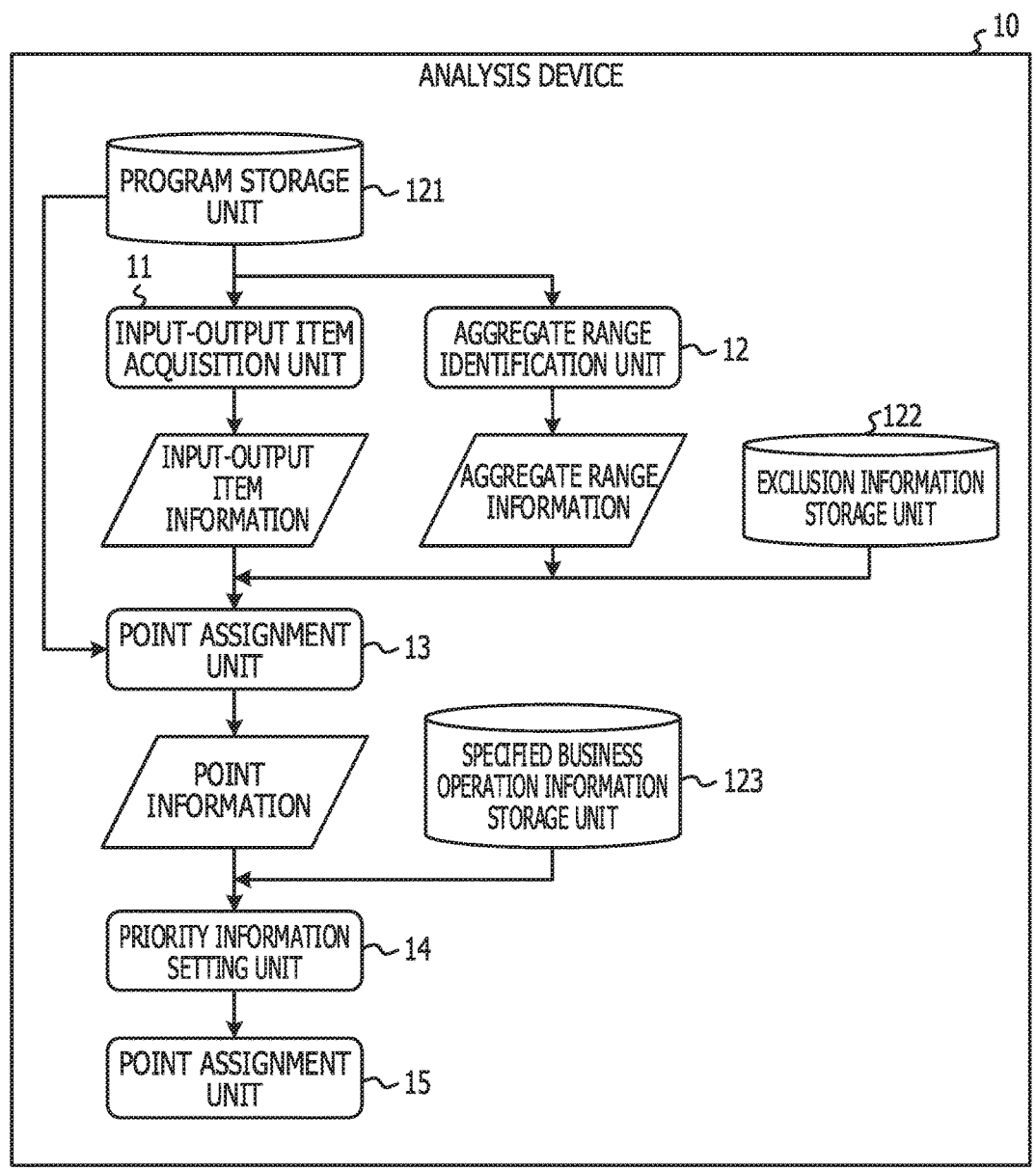
FIG. 2 illustrates an example of a functional configuration of the analysis device in the present embodiment.

FIG. 2 illustrates an example of a functional configuration of the analysis device in the present embodiment. In FIG. 2, the analysis device 10 includes an input-output item acquisition unit 11, an aggregate range identification unit 12, a point assignment unit 13, a priority information setting unit 14, an output unit 15, and so forth. One or more programs installed into the analysis device 10 cause CPU 104 to perform processing, thereby realizing these individual units. In addition, the analysis device 10 uses a program storage unit 121, an exclusion information storage unit 122, a specified business operation information storage unit 123, and so forth. These individual storage units are realized using, for example, the auxiliary storage device 102 or a storage device or the like able to be coupled to the analysis device 10 via the network.

In the program storage unit 121, source files of one or more programs defined as analysis targets are stored. In the present embodiment, programs described based on a common business oriented language (COBOL) are defined as targets. In the present embodiment, one program corresponds to one source file. Note that the source file is a file in which the source code of a program is described.

The input-output item acquisition unit 11 acquires (extracts) input-output items from the source files stored in the program storage unit 121. In the present embodiment, an item corresponds to a variable in COBOL. In the present embodiment, the input-output item is an item in which data input to the corresponding program or data output by the corresponding program is stored. Based on a syntax, tracking of an assignment relationship between items, or the like, the input-output item acquisition unit 11 identifies the input-output items.

In the present embodiment, it is assumed that data input to a program or data output by a program is data related to a business operation. In other words, in the present embodiment, it is assumed that determination processing, computation processing, and so forth related to those pieces of data are portions corresponding to the "business logic". Therefore, in order to identify a portion closely related to the business logic, the input-output item acquisition unit 11 acquires input-output items from the corresponding source file and outputs input-output item information indicating the acquired input-output items. Note that, in the present embodiment, for example, data input or output via a screen, data output to a business form, data input from a file, a database, or the like, or data output to a file, a database, or the like is an example of data corresponding to the input-output item.

The aggregate range identification unit 12 identifies, in a source file, a range to serve as the aggregate unit of points (hereinafter, called an "aggregate range") and outputs aggregate range information indicating the identified aggregate range. In the present embodiment, the point is a value assigned to each of the input-output items in order to evaluate the degree of complexity or the degree of importance of the business logic. In the present embodiment, a program, a section, and a condition part are examples of the unit of an aggregate range. The program is defined in units of source files. The section is defined in units of sections in COBOL. The condition part is defined in units of conditional statements. One of the units, defined as the unit of the aggregate range, is preliminarily selected by a user.

In a case where a massive program is defined as a target, the business logic becomes massive. Therefore, it is difficult to understand the entire business logic at once. Therefore, in the present embodiment, in order to make identifiable a portion including an important business logic (for example, a business logic or the like difficult to understand) to be understood on a priority basis, a program group or a program is divided into one or more aggregate ranges.

For each of aggregate ranges identified based on the aggregate range information, the point assignment unit 13 assigns a point to an input-output item included in the relevant aggregate range. In the present embodiment, points related to 3 types of index value of a business operation factor amount (R1), a business operation determination multiplicity (R2), and a business operation computational amount (R1-comp) are assigned.

In the present embodiment, the business operation factor amount (R1) is the number of items of input-output items referenced in a conditional statement within the corresponding aggregate range. In the present embodiment, the business operation determination multiplicity (R2) is the maximum number of times out of the numbers of times the respective input-output items are referenced in a conditional statement within the corresponding aggregate range. In the present embodiment, the business operation computational amount (R1-comp) is the number of items of input-output items referenced in a computational expression located within the corresponding aggregate range.

Note that, at the time of computing the above-mentioned points, an input-output item is identified based on the input-output item information. In addition, based on exclusion information stored in the exclusion information storage unit 122, a condition part or a computational expression, which is related to formal checking or the like, is excluded from point addition targets. The exclusion information is information used for identifying a condition part, a computational expression, or the like, which is related to formal checking or the like, and the exclusion information is preliminarily set by a user.

For each of the aggregate ranges, the priority information setting unit 14 aggregates points assigned to the respective input-output items, thereby prioritizing, based on an aggregate result, the individual aggregate ranges. At the time of the prioritization, based on specified business operation information stored in the specified business operation information storage unit 123, aggregate ranges to serve as targets of the prioritization may be narrowed down. In the present embodiment, the specified business operation information is information indicating a keyword or the like related to a specific business operation or the like and is preliminarily set by a user. In a case where the specified business operation information is set, only aggregate ranges including, for example, keywords indicated by the specified business operation information are defined as targets of the prioritization.

The output unit 15 outputs information indicating a result of the prioritization (or a result of assignment of points performed by the point assignment unit 13).

Figure 3:
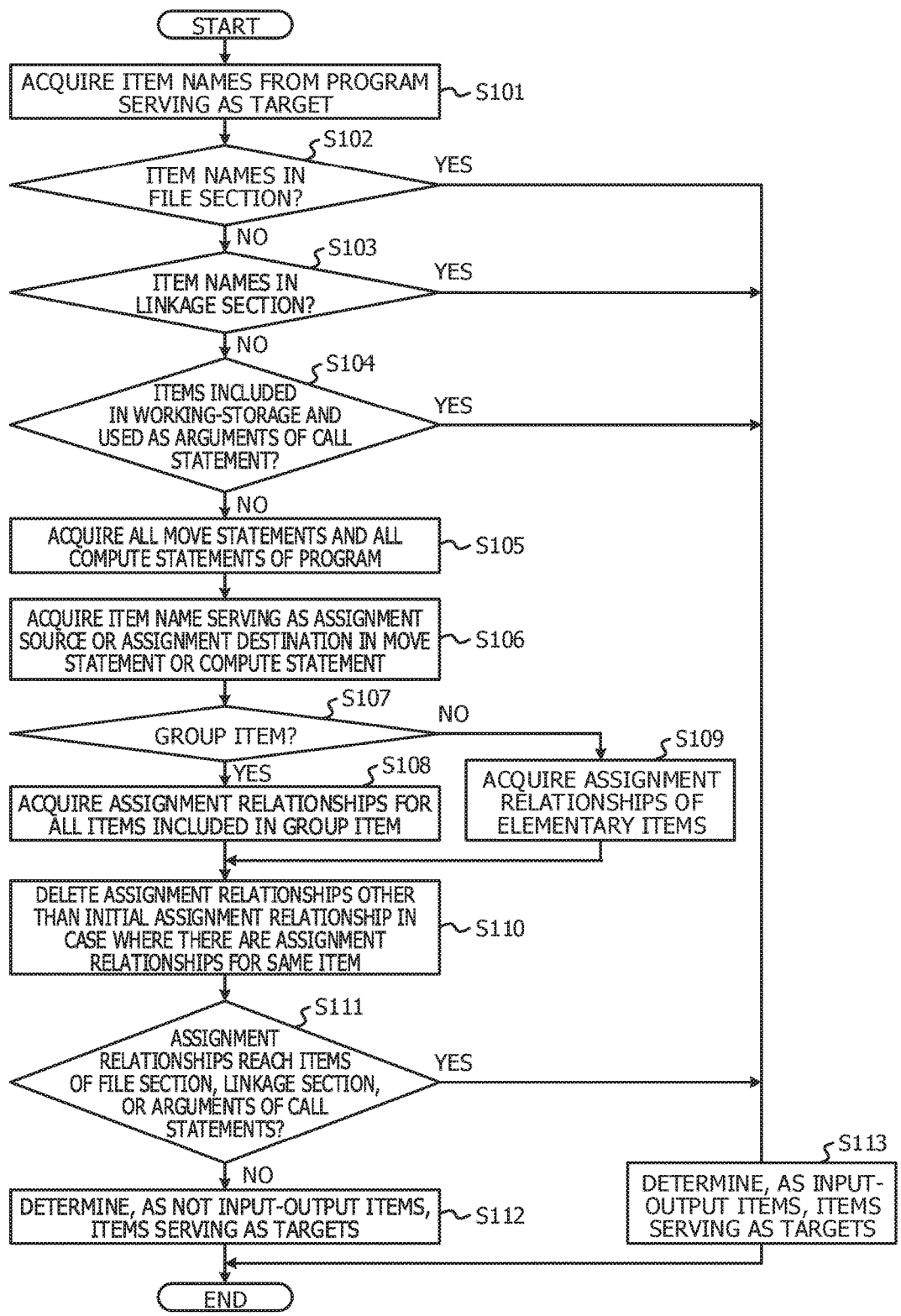
FIG. 3 is a flowchart for explaining an example of a processing procedure of input-output item acquisition processing.

Hereinafter, a processing procedure performed by the analysis device 10 will be described. FIG. 3 is a flowchart for explaining an example of a processing procedure of input-output item acquisition processing.

In step S101, the input-output item acquisition unit 11 acquires all item names from a source code of a program specified as an analysis target.

FIG. 4 illustrates an example of a source code of a program serving as an analysis target. FIG. 4 illustrates a source code described in terms of COBOL. Leading 5-digit numbers in each of lines indicates a line number. For example, "00001" indicates the 1st line. Data items in the program are defined within each of FILE SECTION (the 7th to 14th lines), LINKAGE SECTION (the 22nd to 32nd lines), and WORKING-STORAGE SECTION (the 15th to 21st lines), located within DATA DIVISION (the 6th line).

Subsequently, the input-output item acquisition unit 11 determines that items according to item names, defined in FILE SECTION, out of all the item names are input-output items (Yes in S102, and S113). The reason is that since being items to which pieces of data stored in a file are to be assigned, the items of FILE SECTION clearly correspond to input-output items, based on a syntax.

Subsequently, the input-output item acquisition unit 11 determines that items according to item names, defined in LINKAGE SECTION, out of all the items are input-output items (Yes in S103, and S113). The reason is that since being arguments to be output to other programs or arguments to be input by other programs, the items of LINKAGE SECTION clearly correspond to input-output items, based on a syntax.

Subsequently, the input-output item acquisition unit 11 determines that items according to item names used as arguments of CALL statements are input-output items, the items being included in all the items and the item names being included in item names defined in WORKING-STORAGE SECTION (Yes in S104, and S113). It is difficult to determine, based only on it that the items are defined in WORKING-STORAGE SECTION, whether or not the items defined in WORKING-STORAGE SECTION are input-output items. Therefore, it is determined whether or not being used as arguments of CALL statements. The CALL statements are statements each used for calling another program, and arguments of the CALL statements each correspond to data input to another program or data output by another program. Accordingly, if an item out of the items of WORKING-STORAGE SECTION is an item used as an argument of the CALL statements, the item is determined as an input-output item.

Subsequently, the input-output item acquisition unit 11 acquires all MOVE statements and all COMPUTE statements from the source code serving as the analysis target (S105). In other words, statements in which assignment is performed on items are acquired.

Subsequently, in one of the acquired MOVE statements or one of the acquired COMPUTE statements, the input-output item acquisition unit 11 acquires an item name serving as an assignment source or an assignment destination (S106). Note that an item name of an item already determined as an input-output item is excluded from acquired item names.

Subsequently, as for item names according to a group item, included in the acquired item names, the input-output item acquisition unit 11 acquires, from the source code, assignment relationships of all the items included in the group item (Yes in S107, and S108). On the other hand, as for item names according to elementary items, included in the acquired item names, the input-output item acquisition unit 11 acquires, from the source code, assignment relationships of the relevant elementary items (No in S107, and S109).

In the present embodiment, the assignment relationship of an item is a relationship between items obtained by recursively tracing items whose assignment destinations are the former item until no assignment destination remains or by recursively tracing items whose assignment sources are the former item until no assignment source remains.

Subsequently, in a case where assignment relationships are obtained for a same item, the input-output item acquisition unit 11 deletes, from among the obtained assignment relationships, assignment relationships other than an initial assignment relationship (S110). In the present embodiment, the initial assignment relationship is an assignment relationship that originates from assignment in a line whose line number is a minimum.

Subsequently, by tracing assignment relationships (in other words, assignment sources or assignment destinations), the input-output item acquisition unit 11 determines, as input-output items, items that reach items of FILE SECTION, items of LINKAGE SECTION, or arguments of the CALL statements (Yes in S111, and S113). On the other hand, by tracing assignment relationships (in other words, assignment sources or assignment destinations), the input-output item acquisition unit 11 determines that each of items that does not reach items of FILE SECTION, items of LINKAGE SECTION, or arguments of the CALL statements is not an input-output item (No in S111, and S112). Note that if, for the group item, it is determined that one of elementary items subordinated to the relevant group item is an input-output item, the relevant group item is determined as an input-output item.

The processing in FIG. 3 is performed regarding the source code illustrated in FIG. 4, thereby obtaining such input-output item information as illustrated in, for example, FIG. 5.

FIG. 5 illustrates an example of a configuration of the input-output item information. In FIG. 5, pieces of input-output item information output as a processing result in FIG. 3 are illustrated in a table form. Each of rows in the tables includes an item name, an item type, and input-output determination. The item name is a name of an item. The item type is information indicating whether an item is an elementary item or a group item, a layer of the item, a data form, and so forth. The input-output determination is information indicating whether or not being determined as an input-output item, based on the processing in FIG. 3.

A table (1) in FIG. 5 includes items acquired from FILE SECTION. In other words, the relevant table includes "URIAGE-RECORD" of a 01 record (the 11th line in FIG. 4) and 4 items of "FD-KAIINBANGO", "FD-KUBUN", and "FD-KINGAKU" of a 03 record. Since the items defined in FILE SECTION are determined as input-output items, the values of input-output determination are "◯". "◯" indicates being an input-output item.

A table (2) in FIG. 5 includes items acquired from LINKAGE SECTION. In other words, the items are items defined in the 23rd line to the 32nd line in FIG. 4. Since the items defined in LINKAGE SECTION in FIG. 4 are determined as input-output items, the values of input-output determination are "◯".

A table (3) in FIG. 5 includes items acquired from WORKING-STORAGE SECTION. The items defined in WORKING-STORAGE SECTION are not automatically determined as input-output items, based only on it that the items are defined in WORKING-STORAGE SECTION. The value of input-output determination of, for example, WK-FLG in a 01 record is "x" indicating not being an input-output item. In other words, WK-FLG is not used as an argument of the CALL statements. Therefore, as for WK-FLG, an assignment relationship is acquired. In FIG. 4, MOVE statements are included in the 35th line, the 37th line, the 48th line, the 50th line, the 52nd line, the 54th line, the 56th line, the 59th line, the 60th line, and the 66th line, and a COMPUTE statement is included in the 65th line. Since WK-FLG is a group item, assignment relationships are acquired along with FLG serving as an elementary item subordinated thereto. However, in each of the MOVE statements or the COMPUTE statement, none of WK-FLG and FLG serves as an assignment source or an assignment destination. Accordingly, WK-FLG and FLG are each determined as not an input-output item. On the other hand, since being used as an argument of the CALL statement in the 57th line, WK-IO located within WORKING-STORAGE SECTION is determined as an input-output item.

Note that while, in FIG. 5, in consideration of viewability, the input-output item information is illustrated in a table form, actually the input-output item information may be data described in a comma separated values (CSV) format. FIGS. 6A, 6B, and 6C each illustrates an example of input-output item information in CSV format.

FIG. 6A includes items acquired from FILE SECTION. FIG. 6B includes items acquired from LINKAGE SECTION. FIG. 6C includes items acquired from WORKING-STORAGE SECTION. In addition, in each of lines in FIGS. 6A to 6C, an item name of one of individual items, a layer of the item, an unique name of the item (a name defined from an upper layer), a section name to which the item belongs, and a value of each piece of input-output determination are described while being separated from each other by commas. The value of input-output determination is "1" (being an input-output item) or "0" (not being an input-output item).

Subsequently, processing performed by the aggregate range identification unit 12 will be described. In a case where it is set that aggregate ranges are defined in units of programs, the aggregate range identification unit 12 performs processing in FIG. 7.

Figure 7:
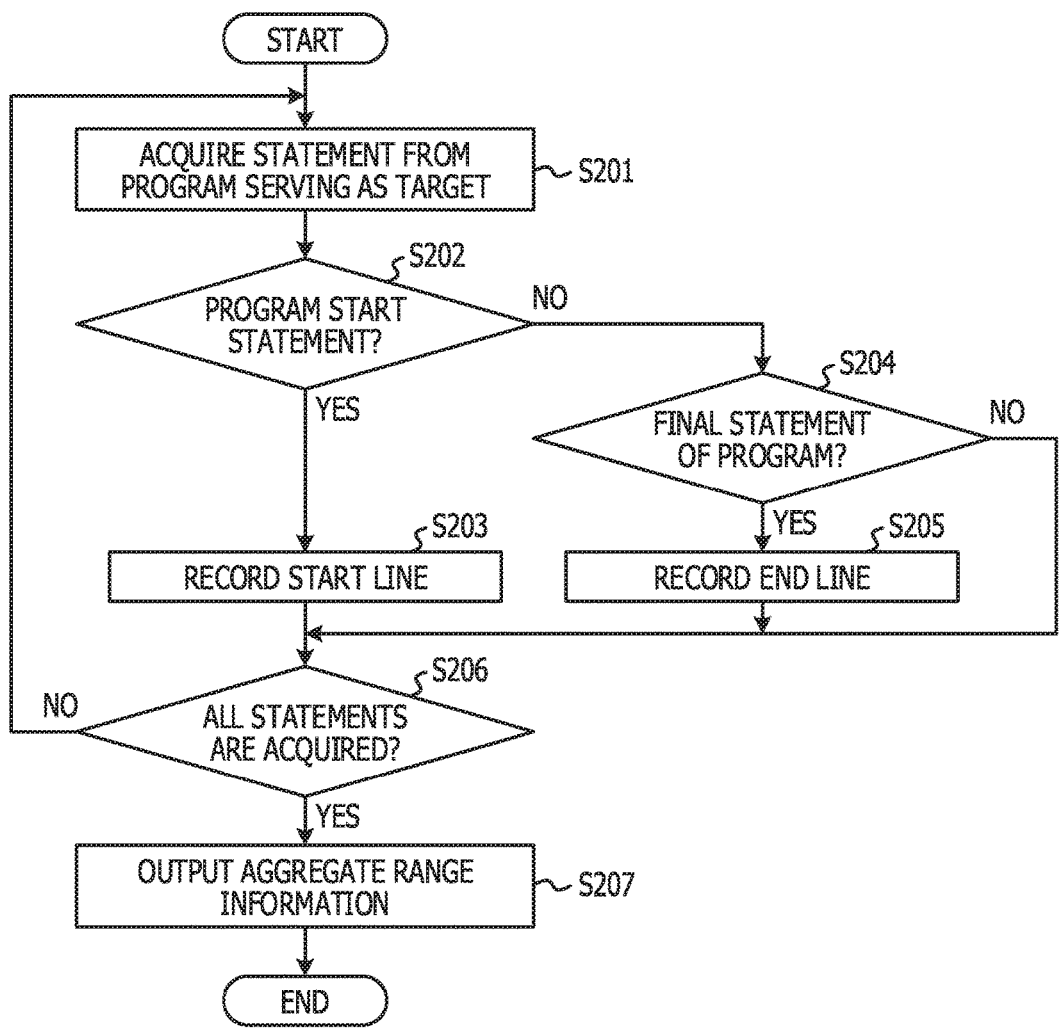
FIG. 7 is a flowchart for explaining an example of a processing procedure of processing for identifying a per-program aggregate range.

FIG. 7 is a flowchart for explaining an example of a processing procedure of processing for identifying a per-program aggregate range.

In step S201, the aggregate range identification unit 12 acquires one statement (one line) in order starting from an initial line of a source code of a program serving as an analysis target. The acquired statement is called a "target statement" hereinafter. Subsequently, the aggregate range identification unit 12 determines whether or not the target statement is a start statement of the program (S202). In the present embodiment, a portion of PROCEDURE DIVISION serving as a processing part of the program is defined as a range of the program. Accordingly, in step S201, it is determined whether or not the target statement is a description indicating a start of PROCEDURE DIVISION.

In a case where the target statement is a description indicating the start of PROCEDURE DIVISION (Yes in S202), the aggregate range identification unit 12 records, as the line number of the start line of an aggregate range, the line number of a line to which the target statement belongs (S203).

On the other hand, in a case where the target statement is not a description indicating the start of PROCEDURE DIVISION (No in S202), the aggregate range identification unit 12 determines whether or not the target statement is a final statement of PROCEDURE DIVISION (S204). In a case where the target statement is the final statement of PROCEDURE DIVISION (Yes in S204), the aggregate range identification unit 12 records, as the line number of the end line of the aggregate range, the line number of a line to which the target statement belongs (S205).

If steps S201 to S205 are performed for all statements of the source code (Yes in S206), the aggregate range identification unit 12 outputs recording results in steps S203 and S205 as the aggregate range information (S207).

FIGS. 8A, 8B, and 8C each illustrate an example of the aggregate range information. FIG. 8A is an example of the aggregate range information output by the processing in FIG. 7. In other words, in FIG. 4, the 33rd line corresponds to the description indicating the start of PROCEDURE DIVISION, and the 68th line corresponds to a description indicating the end of PROCEDURE DIVISION. Accordingly, the 33rd line is recorded for "Begin" indicating a start line, and the 68th line is recorded for "End" indicating an end line.

Note that in a case where the aggregate ranges are defined in units of programs, programs are likely to be specified as analysis targets. In that case, FIG. 3 and FIG. 7 are performed for each of the programs.

Figure 9:
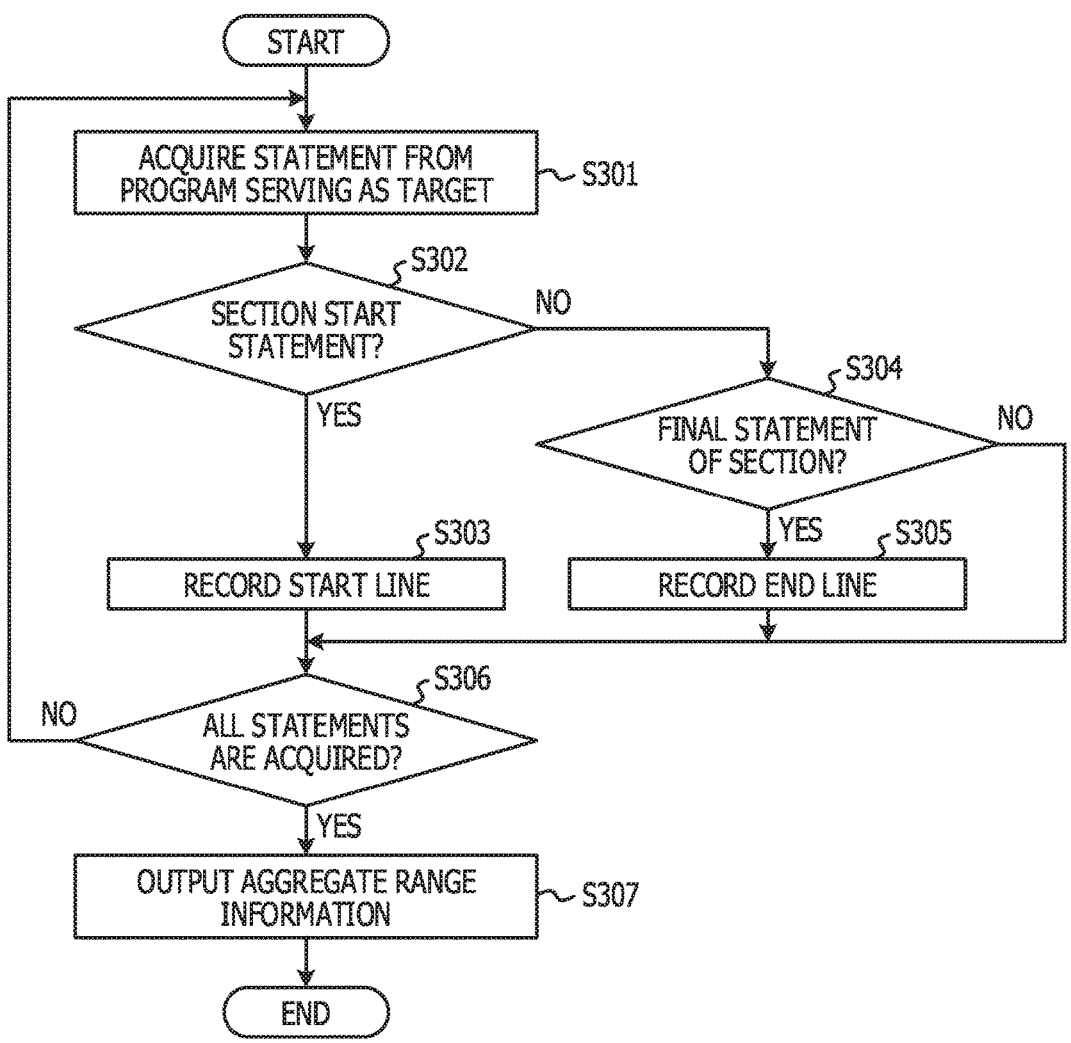
FIG. 9 is a flowchart for explaining an example of a processing procedure of processing for identifying a per-section aggregate range.

In a case where it is set that the aggregate ranges are defined in units of sections, the aggregate range identification unit 12 performs processing in FIG. 9.

FIG. 9 is a flowchart for explaining an example of a processing procedure of processing for identifying a per-section aggregate range. Note that a section to serve as an aggregate range is a section within PROCEDURE DIVISION.

In step S301, the aggregate range identification unit 12 acquires one statement (one line) in order starting from an initial line of PROCEDURE DIVISION of a source code of a program serving as an analysis target. The acquired statement is called a "target statement" hereinafter. Subsequently, the aggregate range identification unit 12 determines whether or not the target statement is a start statement of a section (S302). The start statement of the section is a start statement of PROCEDURE DIVISION or a statement starting with "SECTION". In a case where the target statement is a description indicating the start of the section (Yes in S302), the aggregate range identification unit 12 records, as the line number of the start line of an aggregate range, the line number of a line to which the target statement belongs (S303).

On the other hand, in a case where the target statement is not the start statement of the section (No in S302), the aggregate range identification unit 12 determines whether or not the target statement is a final statement of the section (S304). In a case where the target statement is the final statement of the section (Yes in S304), the aggregate range identification unit 12 records, as the line number of the end line of the aggregate range, the line number of a line to which the target statement belongs (S305).

If steps S301 to S305 are performed for all statements within PROCEDURE DIVISION of the source code (Yes in S306), the aggregate range identification unit 12 outputs recording results in steps S303 and S305 as the aggregate range information (S307).

FIG. 8B is an example of the aggregate range information output by the processing in FIG. 9. In other words, in FIG. 4, the 33rd line to the 44th line correspond to the 1st section. In addition, the 45th line to the 68th line correspond to the 2nd section. Accordingly, in FIG. 8B, a start line and an end line of each of the two sections are recorded. In this case, the two aggregate ranges exist.

Figure 10:
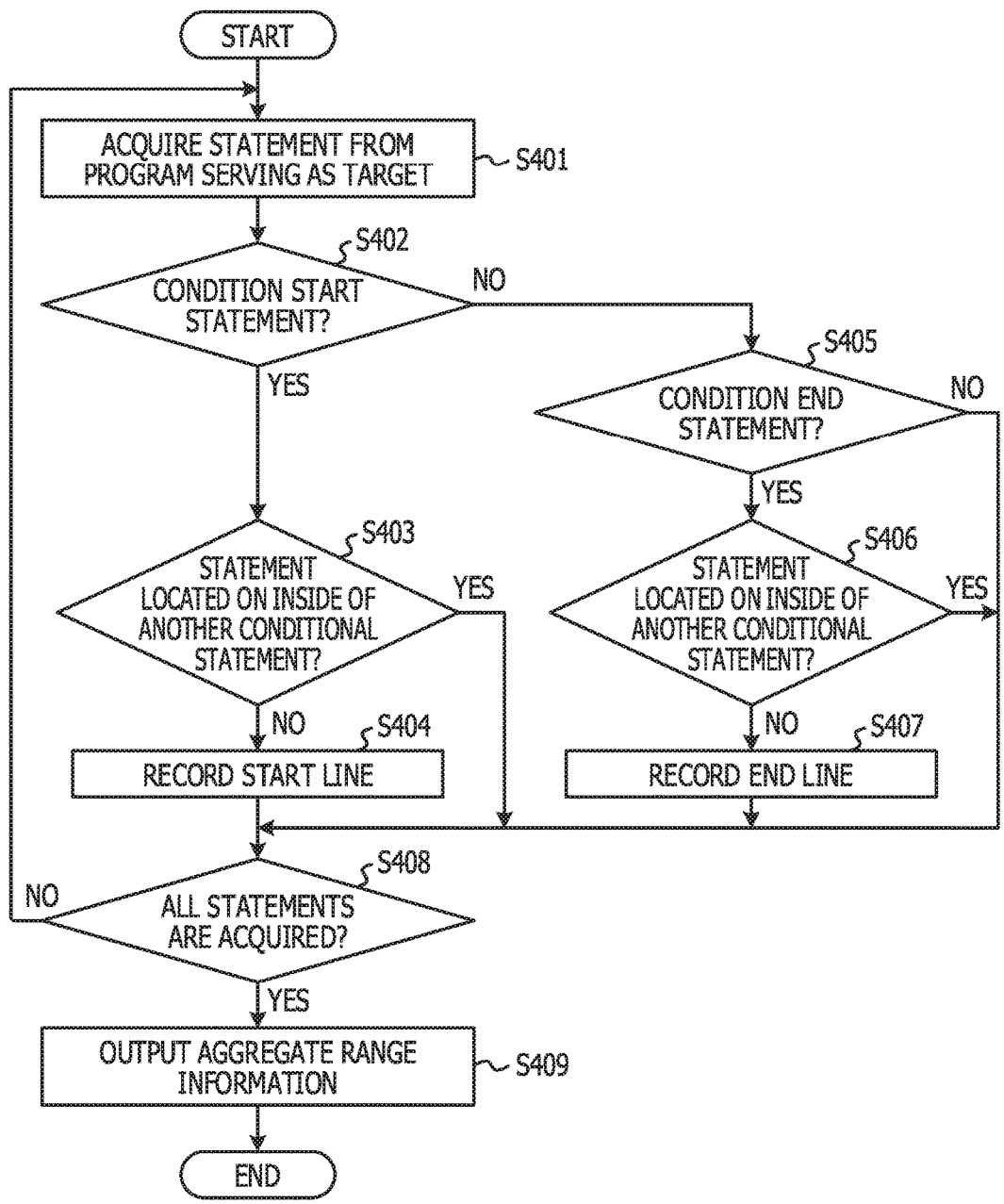
FIG. 10 is a flowchart for explaining an example of a processing procedure of processing for identifying a per-conditional-statement aggregate range.

In addition, in a case where the aggregate ranges are defined in units of conditional statements, the aggregate range identification unit 12 performs processing in FIG. 10.

FIG. 10 is a flowchart for explaining an example of a processing procedure of processing for identifying a per-conditional-statement aggregate range. Note that, in the present embodiment, a conditional statement is an IF statement or an EVALUATE statement.

In step S401, the aggregate range identification unit 12 acquires one statement (one line) in order starting from an initial line of a source code of a program serving as an analysis target. The acquired statement is called a "target statement" hereinafter. Subsequently, the aggregate range identification unit 12 determines whether or not the target statement is a condition start statement (S402). It is determined whether or not the target statement is, for example, the IF statement or the EVALUATE statement. In a case where the target statement is the condition start statement (Yes in S402), the aggregate range identification unit 12 determines whether or not the target statement is a conditional statement located on the inside of another conditional statement (S403). In other words, the conditional statement is able to be defined on the inside of another conditional statement. In step S403, it is determined whether or not a conditional statement whose condition start statement is the target statement is defined on the inside of another conditional statement.

In a case where the target statement is not located on the inside of another conditional statement (No in S403), the aggregate range identification unit 12 records, as the line number of the start line of an aggregate range, the line number of a line to which the target statement belongs (S404). On the other hand, in a case where the target statement is located on the inside of the other conditional statement (Yes in S403), the target statement is not the start line of the aggregate range. The reason is that, in the present embodiment, a conditional statement located on the inside of another conditional statement is not independently defined as an aggregate range.

On the other hand, in a case where the target statement is not the condition start statement (No in S402), the aggregate range identification unit 12 determines whether or not the target statement is a condition end statement (S405). Specifically, it is determined whether or not the target statement is an END-IF statement or an END-EVALUATE statement. In a case where the target statement is the condition end statement (Yes in S405), the aggregate range identification unit 12 determines whether or not the target statement is a condition end statement located on the inside of another conditional statement (S406).

In a case where the target statement is not located on the inside of another conditional statement (No in S406), the aggregate range identification unit 12 records, as the line number of the end line of the aggregate range, the line number of a line to which the target statement belongs (S407). On the other hand, in a case where the target statement is located on the inside of the other conditional statement (Yes in S406), the target statement is not the end line of the aggregate range.

If steps S401 to S407 are performed for all statements of the source code (Yes in S408), the aggregate range identification unit 12 outputs recording results in steps S404 and S407 as the aggregate range information (S409).

FIG. 8C is an example of the aggregate range information output by the processing in FIG. 10. In other words, in FIG. 4, there are 5 conditional statements as outermost conditional statements. Accordingly, a start line and an end line are recorded for each of the 5 conditional statements.

Figure 11:
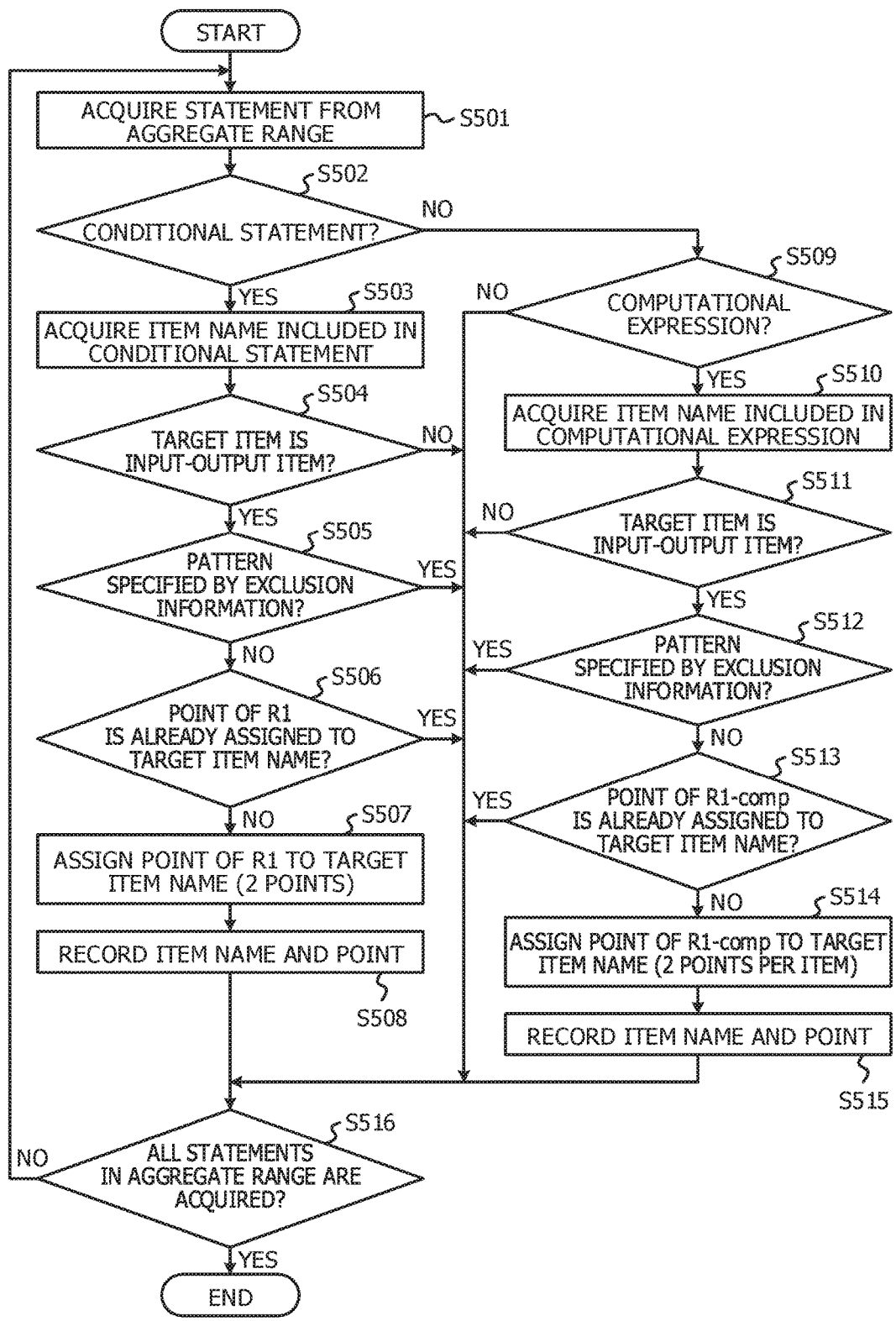
FIG. 11 is a flowchart for explaining an example of a processing procedure of processing for assigning points related to a business operation factor amount and points related to a business operation computational amount.

Subsequently, processing performed by the point assignment unit 13 will be described. FIG. 11 is a flowchart for explaining an example of a processing procedure of processing for assigning points related to the business operation factor amount (R1) and points related to the business operation computational amount (R1-comp). In FIG. 11, steps S503 to S508 correspond to a procedure for assigning points related to the business operation factor amount (R1), and steps S510 to S515 correspond to a procedure for assigning points related to the business operation computational amount (R1-comp). Note that the processing in FIG. 11 is performed for each of aggregate ranges indicated by the aggregate range information.

In step S501, the point assignment unit 13 acquires one statement (one line) in order starting from an initial line of an aggregate range serving as an analysis target. The acquired statement is called a "target statement" hereinafter. Subsequently, the point assignment unit 13 determines whether or not the target statement is a conditional statement (S502). In the present embodiment, the conditional statement corresponds to the condition start statement in FIG. 10. Note that, as for the determination in step S502, it is not determined whether or not being located on the inside of anther conditional statement.

In a case where the target statement is the conditional statement (Yes in S502), the point assignment unit 13 acquires an item name included in the target statement (S503). In other words, an item name defined as a target of conditional determination is acquired. The acquired item name is called a "target item name" hereinafter. Note that target item names are acquired in some cases. The reason is that there is a case where items are referenced in one conditional statement. In a case where there are target item names, processing operations in and subsequent to step S504 are performed for each of the target item names.

Subsequently, the point assignment unit 13 determines whether or not the target item name is included in input-output item information (S504). In other words, it is determined whether or not an item according to the target item name is an input-output item.

In a case where the target item name is included in the input-output item information (Yes in S504), the point assignment unit 13 determines whether or not the target statement or the target item name corresponds to a pattern specified by exclusion information (S505).

Figure 12:
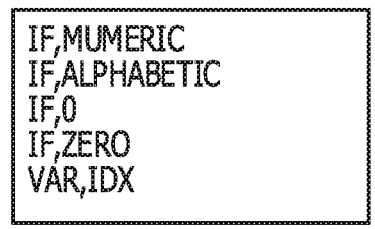
FIG. 12 illustrates an example of a configuration of exclusion information.

FIG. 12 illustrates an example of a configuration of the exclusion information. In FIG. 12, the exclusion information is illustrated in a CSV format. The 1st field of each of lines indicates a candidate for application of the exclusion information indicated by the relevant line. The 2nd field thereof indicates a condition in which the exclusion information indicated by the relevant line is applied.

The 1st to 4th lines in, for example, FIG. 12 indicate that an item to be compared with NUMERIC, ALPHABETIC, "0", or ZERO in an IF statement is excluded from assignment targets of points. The reason is that there is a high possibility that such conditional statements correspond not to processing dependent on a business operation but to processing for checking a data form. The 5th line indicates that an item name partially or wholly including IDX is excluded from assignment targets of points. The reason is that there is a high possibility that an item whose item name includes IDX is some kind of index or the like and is not data dependent on a business operation.

In a case where the target statement or the target item name does not correspond to a pattern specified by the exclusion information (No in S505), the point assignment unit 13 determines whether or not a point related to the business operation factor amount (R1) is already assigned to the target item name (S506). The reason is that redundantly assigning points to one item name is intended to be avoided.

In a case where a point related to the business operation factor amount (R1) is not already assigned to the target item name (No in S506), the point assignment unit 13 assigns, to the target item name, a point related to the business operation factor amount (R1) (S507). In the present embodiment, for the sake of convenience, a unit of assigned points is 2 points. In this regard, however, a unit of assigned points may be 1 point or 3 or more points. Subsequently, the point assignment unit 13 records a point related to the business operation factor amount (R1) while associating the point related to the business operation factor amount (R1) with the target item name (S508). Note that in a case where no target item name is included in the input-output item information (No in S504), if the target item name or the target statement is matched with a pattern (a condition) specified by the exclusion information (Yes in S505) or if a point related to the business operation factor amount (R1) is already assigned to the target item name (Yes in S506), no point is assigned to the target item name, and the processing in FIG. 11 proceeds to step S516.

On the other hand, in a case where the target statement is not a conditional statement (No in S502), the point assignment unit 13 determines whether or not the target statement is a computational expression (S509). In the present embodiment, the computational expression is a COMPUTE statement, an ADD statement, a SUBTRACT statement, a MULTIPLY statement, or a DIVIDE statement. In a case where the target statement is not a conditional statement (No in S509), the processing in FIG. 11 proceeds to step S516.

In a case where the target statement is the conditional statement (Yes in S509), the same processing operations as those in steps S503 to S508 are performed in steps S510 to S515. In this regard, however, in step S513, it is determined whether or not a point related to the business operation computational amount (R1-comp) is already assigned to the target item name. In addition, in step S514, a point related to the business operation computational amount (R1-comp) is assigned to the target item name. Furthermore, in step S515, a point related to the business operation computational amount (R1-comp) is recorded while being associated with the target item name.

If steps S501 to S515 are performed for all statements of the aggregate range serving as a processing target (Yes in S516), the processing in FIG. 11 is terminated.

In a case where, regarding the source code illustrated in FIG. 4, FIGS. 6A to 6C and FIG. 8A are applied and the processing in FIG. 11 is performed (in other words, in a case where the aggregate ranges are defined in units of programs), processing results illustrated in, for example, FIG. 13 and FIG. 14 are obtained.

FIG. 13 illustrates an example of point information related to the business operation factor amount (R1) in a per-program aggregate range. Tables (1) to (3) in FIG. 13 correspond to the tables (1) to (3) in FIG. 5, respectively. In this regard, however, a column of points is added to each of the tables in FIG. 13. Values of the column of points are points, recorded in step S508 in FIG. 11 and related to the business operation factor amount (R1). The per-program aggregate range stretches from the 33rd line to the 68th line in FIG. 4, based on FIG. 8A. Accordingly, each of lines in this range is defined as a processing target in FIG. 11.

A conditional statement exists in the 36th line in FIG. 4, and KUBUN1 is referenced in the relevant conditional statement. KUBUN1 is an input-output item according to the input-output item information in FIGS. 6A to 6C. Therefore, in the table (2) in FIG. 13, 2 points are assigned to KUBUN1. Note that while, in the 36th line, comparison with 4 invariables of 00, 01, 02, and 03 is performed for KUBUN1, points related to the business operation factor amount (R1) are not redundantly assigned to one item name, and therefore, only 2 points are assigned to KUBUN1. In the same way, while KUBUN1 is referenced in a conditional statement (an EVALUATE statement) in the 46th line, no point is assigned thereto for the 46th line.

In addition, since KAIINBANGO referenced in a conditional statement in the 40th line in FIG. 4 is an input-output item, 2 points are assigned thereto. In addition, since WK-ERR referenced in a conditional statement in the 58th line is an input-output item, 2 points are assigned thereto. On the other hand, since FLG referenced in an IF statement in the 62nd line is not an input-output item, no point is assigned thereto.

In addition, FIG. 14 illustrates an example of point information related to the business operation computational amount (R1-comp) in a per-program aggregate range. Tables (1) to (3) in FIG. 14 correspond to the tables (1) to (3) in FIG. 5, respectively. In this regard, however, a column of points is added to each of the tables in FIG. 14. Values of the column of points are points, recorded in step S515 in FIG. 11 and related to the business operation computational amount (R1-comp).

In the COMPUTE statement in the 65th line in FIG. 4, O-KOUNYUKAISU and I-KOUNYUKAISU are referenced. Since being an input-output item according to FIG. 6B, each of these is assigned with 2 points.

Figure 15:
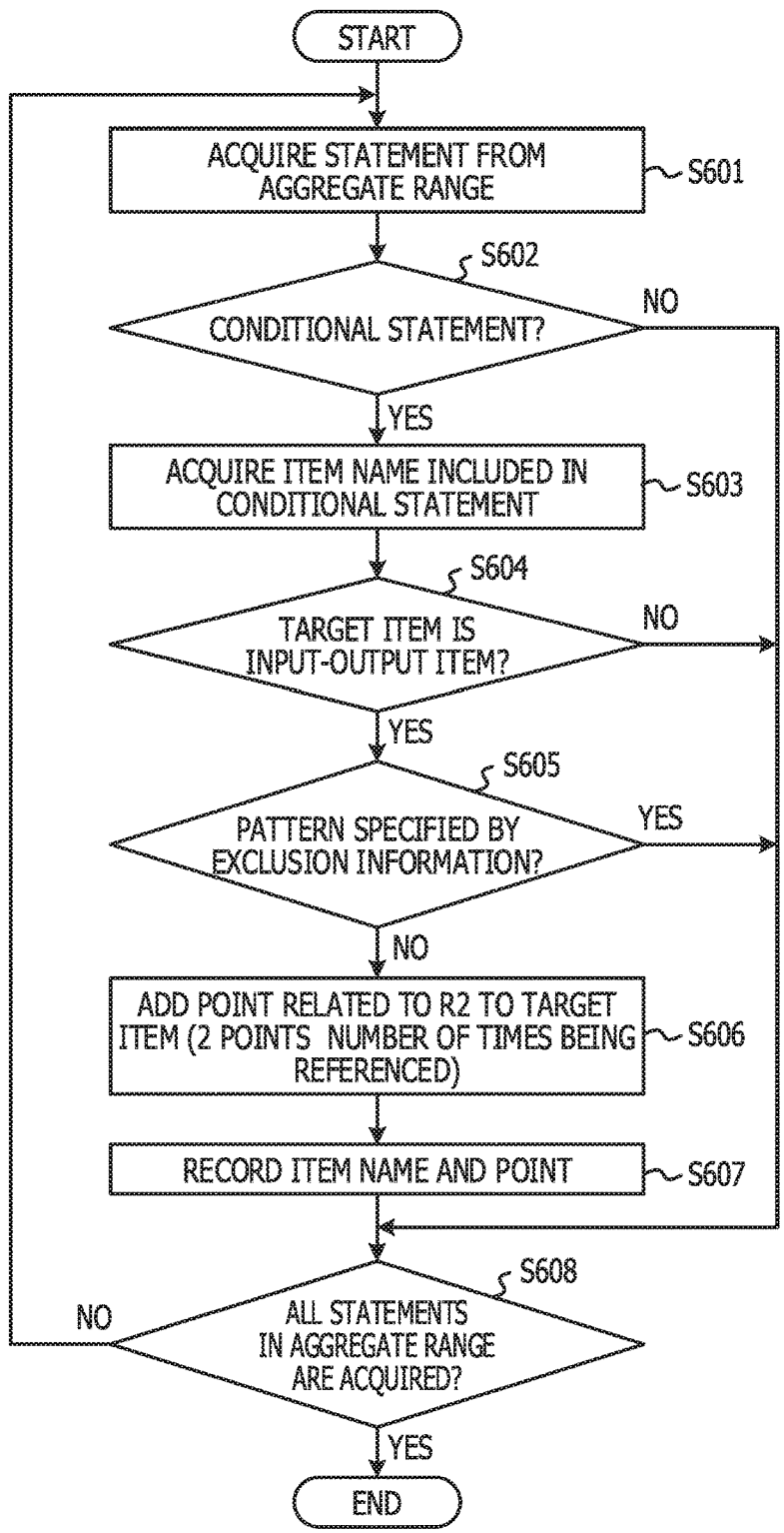
FIG. 15 is a flowchart for explaining an example of a processing procedure of processing for assigning points related to a business operation determination multiplicity.

Subsequently, processing for assigning points related to the business operation determination multiplicity (R2) will be described. FIG. 15 is a flowchart for explaining an example of a processing procedure of processing for assigning points related to the business operation determination multiplicity (R2). The processing in FIG. 15 may be performed before or after the processing in FIG. 11 and may be performed in parallel with the processing in FIG. 11. Note that the processing in FIG. 15 is performed for each of aggregate ranges indicated by the aggregate range information.

In FIG. 15, steps S601 to S605 are the same processing operations as those in steps S501 to S505 in FIG. 11. In step S606, the point assignment unit 13 adds, to the target item name, a point related to the business operation determination multiplicity (R2). Here, points related to the business operation determination multiplicity (R2) are calculated by 2×the number of times the target item name is referenced in a conditional statement serving as the target statement. In the present embodiment, the number of times being referenced is the number of times being compared. The reason why being multiplied by "2" is that a unit of points is 2 points.

In a case where the target statement is the IF statement in, for example, the 36th line, KUBUN1 is compared with 4 invariables. Accordingly, in this case, 4×2=8 is added to KUBUN1. In addition, in a case where the target statement is the EVALUATE statement in the 46th line, the number of times WHEN belonging to the relevant EVALUATE statement is specified (in this regard, however, "WHEN OTHER" is excluded) corresponds to the number of times being compared. Accordingly, in this case, 3×2=6 is added to KUBUN1. Note that, in FIG. 15, a processing operation corresponding to step S506 in FIG. 11 is not performed. Accordingly, points may be added to the same item name more than once. Subsequently, the point assignment unit 13 updates points, related to the business operation determination multiplicity (R2) and recorded while being associated with the target item name (S607). If steps S601 to S607 are performed for all statements in the aggregate range serving as a processing target (Yes in S608), the processing in FIG. 15 is terminated.

In a case where, regarding the source code illustrated in FIG. 4, FIGS. 6A to 6C and FIG. 8A are applied and the processing in FIG. 15 is performed (in other words, in a case where the aggregate ranges are defined in units of programs), processing results illustrated in, for example, FIG. 16 are obtained.

FIG. 16 illustrates an example of point information related to the business operation determination multiplicity (R2) in a per-program aggregate range. Tables (1) to (3) in FIG. 16 correspond to the tables (1) to (3) in FIG. 5, respectively. In this regard, however, a column of points is added to each of the tables in FIG. 16. Values of the column of points are points, updated in step S607 in FIG. 15 and related to the business operation determination multiplicity (R2).

Since being referenced 4 times in, for example, the IF statement in the 36th line in FIG. 4 and being referenced 3 times in, for example, the EVALUATE statement in the 46th line, KUBUN1 is assigned with (4+3)×2=14 points.

Figure 17:
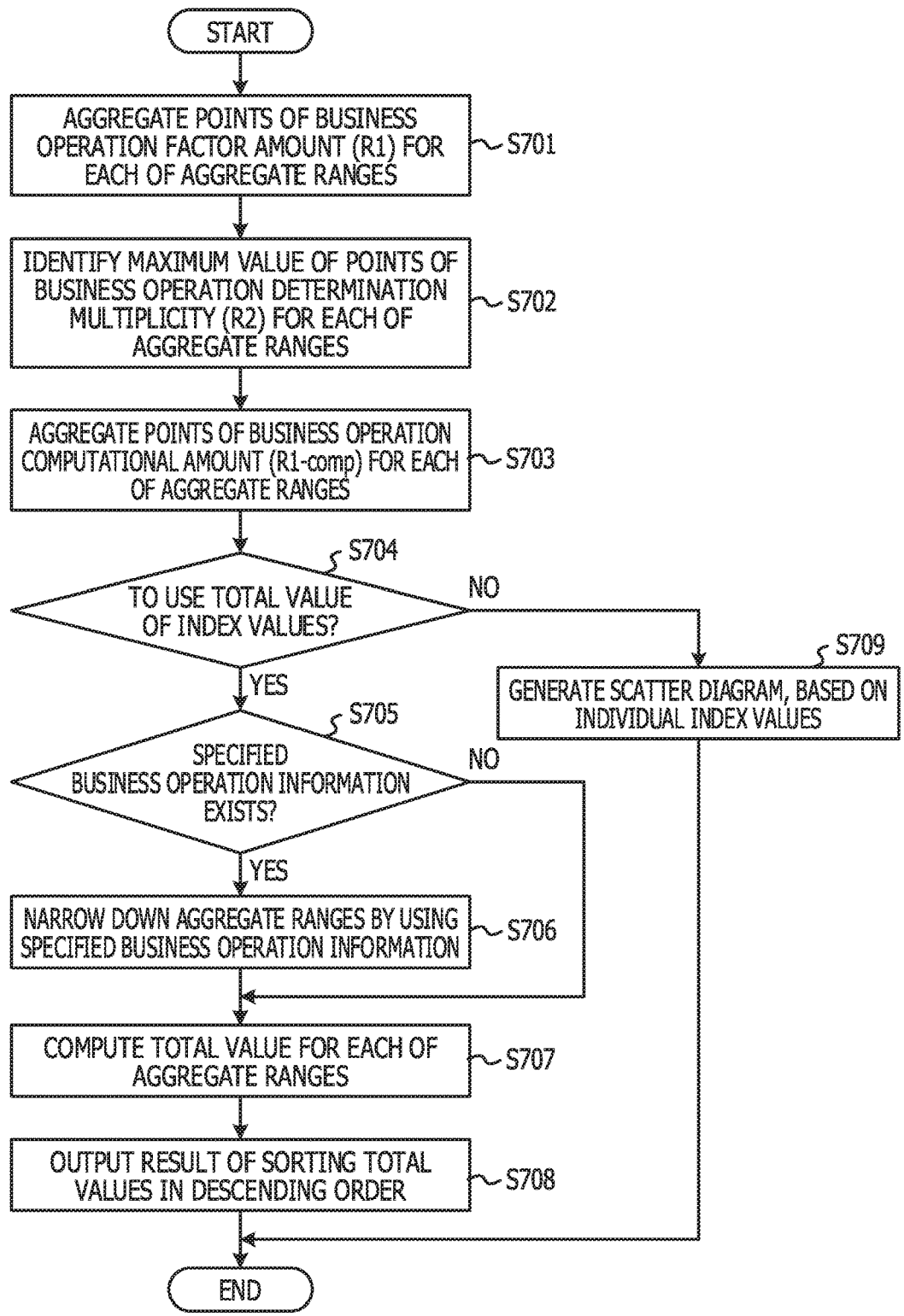
FIG. 17 is a flowchart for explaining an example of a processing procedure of setting processing for priority information.

Subsequently, processing operations performed by the priority information setting unit 14 and the output unit 15 will be described. FIG. 17 is a flowchart for explaining an example of a processing procedure of setting processing for priority information.

In step S701, for each of aggregate ranges, the priority information setting unit 14 aggregates points related to the business operation factor amount (R1). If the aggregate ranges are defined in units of programs, the total sum of points in FIG. 13 is calculated. An aggregate result of points in FIG. 13 is 6 points. The aggregate result in step S701 is the business operation factor amount (R1) for each of the aggregate ranges.

Subsequently, for each of the aggregate ranges, the priority information setting unit 14 identifies a maximum value of points related to the business operation determination multiplicity (R2) (S702). If the aggregate ranges are defined in units of programs, a maximum value of points in FIG. 16 is identified. The maximum value of points in FIG. 16 is 14 points. An identification result in step S702 is the business operation determination multiplicity (R2) for each of the aggregate ranges.

Subsequently, for each of the aggregate ranges, the priority information setting unit 14 aggregates points related to the business operation computational amount (R1-comp) (S703). If the aggregate ranges are defined in units of programs, the total sum of points in FIG. 14 is calculated. An aggregate result of points in FIG. 14 is 4 points. The aggregate result in step S703 is the business operation computational amount (R1-comp) for each of the aggregate ranges.

Subsequently, the priority information setting unit 14 determines whether or not to use the total value of the index values (R1, R2, and R1-comp) for prioritization (dominance determination) between the aggregate ranges (S704). The relevant determination is based on, for example, a setting made by a user. In other words, in step S704, it is determined whether or not performing prioritization by using the relevant total value is set.

In a case where to use the relevant total value is set (Yes in S704), the priority information setting unit 14 determines whether or not specified business operation information is stored in the specified business operation information storage unit 123 (whether or not the specified business operation information is set) (S705). In a case where the specified business operation information is stored in the specified business operation information storage unit 123 (Yes in S705), the priority information setting unit 14 narrows down aggregate ranges to serve as targets of prioritization, based on the specified business operation information (S706).

FIG. 18 illustrates an example of the specified business operation information. The specified business operation information is information including one or more keywords (character strings). In step S706, aggregate ranges each including one of the keywords included in the specified business operation information are selected as targets of the prioritization. If the aggregate ranges are defined in units of, for example, programs, programs each including one of the keywords included in the specified business operation information are defined as targets of the prioritization. In FIG. 4, "HINMEI" is included in the 56th line. Accordingly, the program illustrated in FIG. 4 is defined as a target of the prioritization. Note that including all the keywords included in the specified business operation information may be a condition of being selected as a target of the prioritization.

In some cases, an item name has a close relationship with a content of a business operation. The reason is that an item name tends to be named based on information related to a business operation. In such a case, by setting, as the specified business operation information, keywords related to a specific business operation, an aggregate range (a program, a section, a conditional statement, or the like) related to the relevant specified business operation is defined as a target of the prioritization. As a result, an aggregate range related to the specific business operation is defined as a target of analysis on a priority basis.

Note that in a case where no specified business operation information is stored (No in S705), the individual aggregate ranges are defined as targets of the prioritization.

Subsequently, for each of the aggregate ranges defined as targets of the prioritization, the priority information setting unit 14 calculates the total value of the individual index values (S707). In other words, for each of the aggregate ranges, R1+R2+R1-comp is computed. Subsequently, the output unit 15 outputs a result of sorting the total values of the respective aggregate ranges in descending order (S708). An output form thereof is not limited to a predetermined form. The sort result may be displayed on the display device 106 or be output to a printer. Alternatively, the sort result may be transmitted to a predetermined terminal via a network.

Figure 19:
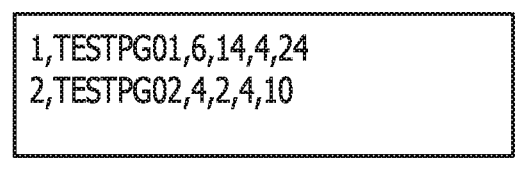

FIG. 19 illustrates an example of a result of sorting, in descending order, total values of respective per-program aggregate ranges. In FIG. 19, for each of the per-program aggregate ranges, a priority order, a program name, the business operation factor amount (R1), the business operation determination multiplicity (R2), the business operation computational amount (R2), and a total value are illustrated in a CSV format. An aggregate range in the 1st line corresponds to the program in FIG. 4. An aggregate range in the 2nd line corresponds to another program, not illustrated.

By looking at the sort result illustrated in FIG. 19, a user is able to understand that there is a high possibility that the program according to TESTPG01 is relatively complex, and the user is able to determine that the relevant program has to be analyzed on a priority basis.

On the other hand, in a case where to use the total value of the index values (R1, R2, and R1-comp) is not set (No in S704), the output unit 15 generates a scatter diagram, based on 2 index values (S709).

Figure 20:
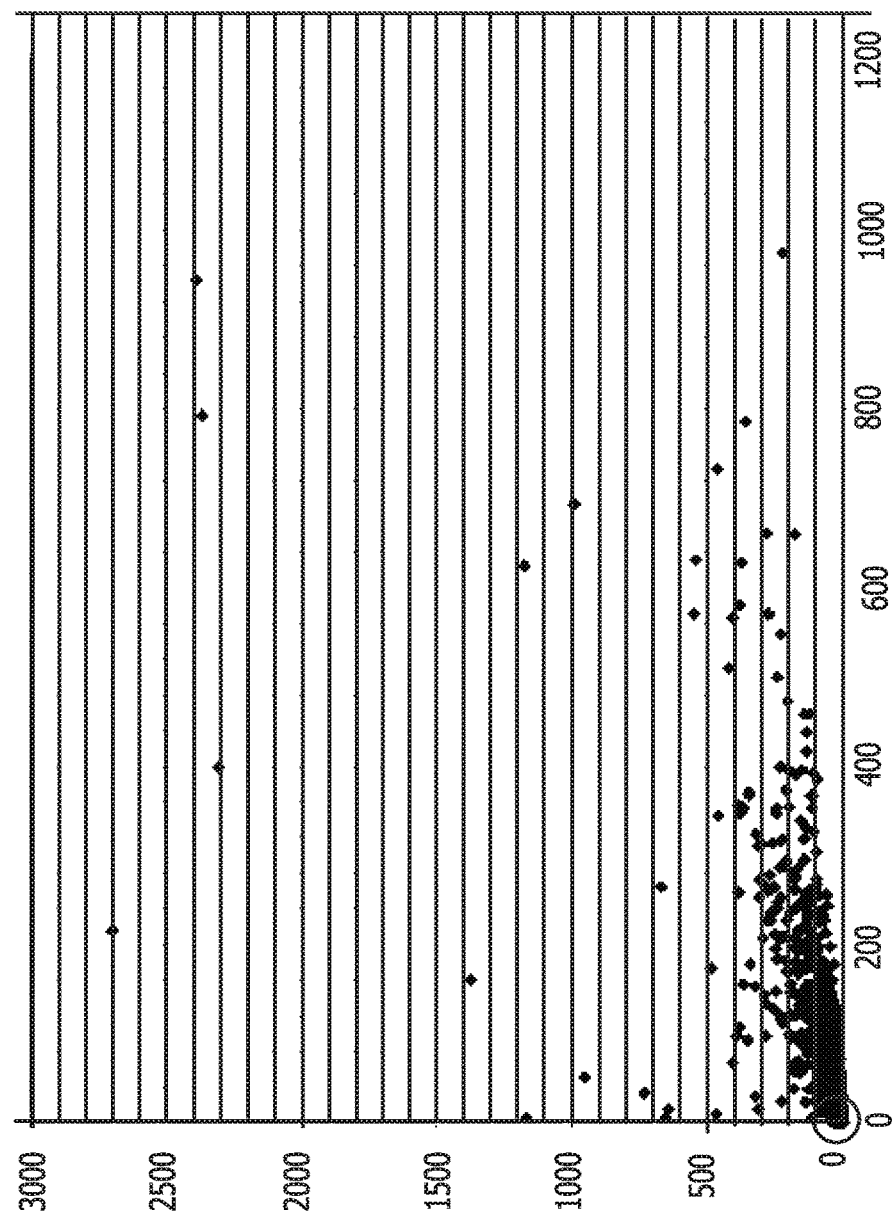
FIG. 20 illustrates an example of a scatter diagram.

FIG. 20 illustrates an example of the scatter diagram. FIG. 20 illustrates a scatter diagram in which individual aggregate ranges are plotted for a 2-dimensional coordinate system whose horizontal axis corresponds to the business operation factor amount (R1) and whose vertical axis corresponds to the business operation determination multiplicity (R2).

The business operation factor amount (R1) mapped to the horizontal axis is the number of items referenced in a conditional statement. On the other hand, the business operation determination multiplicity (R2) mapped to the vertical axis is a maximum value of the numbers of times the respective items are referenced in the conditional statement. Accordingly, it is understood that a plot (an aggregate range) whose value on the vertical axis is large and whose value on the horizontal axis is small is a portion in which the number of items referenced in a conditional statement is large and the numbers of time being referenced is small. It is understood that a plot (an aggregate range) whose value on the vertical axis is small and whose value on the horizontal axis is large is a portion in which the number of items referenced in a conditional statement is small and the number of times being referenced is large. On the other hand, it is understood that a plot (an aggregate range) whose values on both the vertical axis and the horizontal axis are large is a portion in which both the number of items referenced in a conditional statement and the numbers of time being referenced are large. Accordingly, it is estimated that the complexity of such an aggregate range is high.

Note that in a case where the scatter diagram is displayed, the priority information setting unit 14 may calculate distances from an origin of the scatter diagram for respective plots and may prioritize the individual aggregate ranges, based on the distances. For example, a high priority is given to a plot whose distance is long, and a low priority is given to a plot whose distance is short. The reason is that the relevant distance of a region whose values on the two axes are large becomes long. Alternatively, based on a threshold value for the horizontal axis and a threshold value for the vertical axis, a region of the scatter diagram may be divided in quarters. Prioritization may be performed on the region divided in quarters. In addition, the horizontal axis of the scatter diagram may be the business operation factor amount (R1)+the business operation computational amount (R1-comp).

Figure 21:
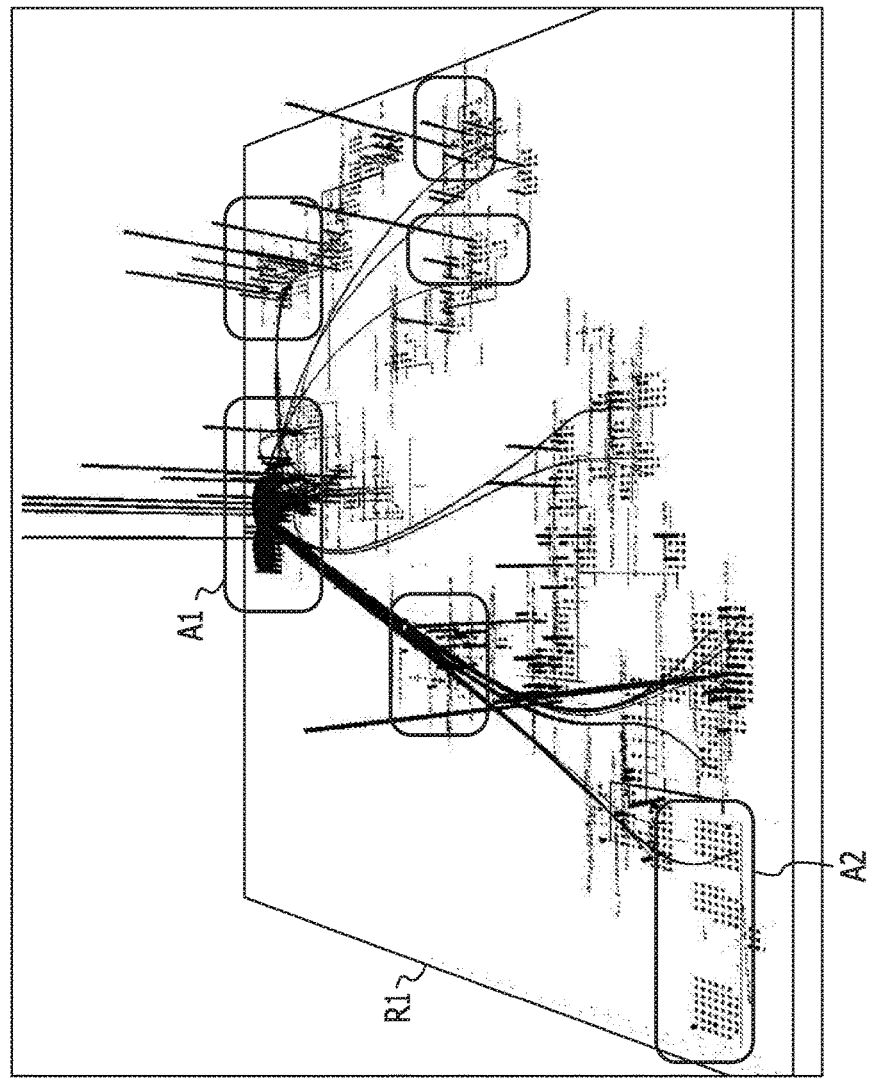
FIG. 21 illustrates an example of visualization on a software map.

Alternatively, the output unit 15 may generate such a software map as illustrated in FIG. 21. FIG. 21 illustrates an example of visualization on a software map.

In the software map illustrated in FIG. 21, a 3-dimensional space is expressed on 2 dimensions. In other words, a rectangle R1 is a plane surface having a depth. A software map illustrating a relationship between individual program is mapped to the relevant plane surface. The software map may be created by using, for example, a technology described in http://pr.fujitsu.com/jp/news/2012/02/29.html, Japanese Laid-open Patent Publication No. 2013-148987, Japanese Laid-open Patent Publication No. 2013-152576, or the like.

Positions to which respective programs are mapped on the software map are defined based on a relationship between the individual programs. At the positions to which the respective programs are mapped, figures that have sizes corresponding to the respective total values of R1, R2, and R1-comp computed for the relevant programs are arranged. FIG. 21 illustrates an example in which buildings that have heights corresponding to the relevant respective total values are arranged. On the software map, programs strongly related to each other are mapped to positions near each other. Accordingly, it is understood that there is a high possibility that a program group mapped to, for example, a region A1 in which high buildings are densely packed is complex in business logic. On the other hand, it is understood that there is a high possibility that a program group mapped to, for example, a region A2 in which low buildings are densely packed is simple in business logic. Accordingly, a user is able to obtain useful information for making a decision about a program group of a group to be analyzed on a priority basis.

Note that while, in the above description, specific examples of processing results in a case where the aggregate ranges are defined in units of programs are illustrated, specific examples of processing results in a case where the aggregate ranges are defined in units of sections will be illustrated in what follows. Each of the following specific examples is based on the source code illustrated in FIG. 4.

FIG. 22 illustrates an example of point information related to the business operation factor amount (R1) in a per-section aggregate range. In other words, FIG. 22 is a result of assigning points related to the business operation factor amount (R1) obtained in a case where the processing in FIG. 11 is performed for each of sections.

PROCEDURE DIVISION of the program illustrated in FIG. 4 includes 2 sections as illustrated in FIG. 8B. The 1st section corresponds to the 33rd line to the 44th line, and the 2nd section corresponds to the 45th line to the 68th line. In FIG. 22, a table (1) corresponds to the 1st section, and a table (2) corresponds to the 2nd section.

In the program in FIG. 4, the 1st section includes conditional statements in the 36th line and the 40th line. In each of the conditional statements, an input-output item whose item name is KUBUN1 or KAIINBANGO is referenced. Accordingly, the table (1) in FIG. 22 illustrates a result in which 2 points are assigned to each of KUBUN1 and KAIINBANGO.

In the program in FIG. 4, in the 2nd section, respective input-output items of KUBUN1 and WK-ERR are referenced in conditional statements. Accordingly, the table (2) in FIG. 22 illustrates a result in which 2 points are assigned to each of KUBUN1 and WK-ERR. Note that while KUBUN1 is included in both the table (1) and the table (2), the reason is that a point is assigned to even the same item for each of the sections.

In addition, FIG. 23 illustrates an example of point information related to the business operation computational amount (R1-comp) in a per-section aggregate range.

Since, in the program in FIG. 4, the 1st section includes no computational expression, no table corresponding to the 1st section is illustrated in FIG. 23. In other words, FIG. 23 illustrates a result in which 2 points are assigned to each of I-KOUNYUKAISU and O-KOUNYUKAISU included in the computational expression in the 65th line in the 2nd section in the program in FIG. 4.

Furthermore, FIG. 24 illustrates an example of point information related to the business operation determination multiplicity (R2) in a per-section aggregate range. In FIG. 24, a table (1) corresponds to the 1st section, and a table (2) corresponds to the 2nd section.

In the program in FIG. 4, KUBUN1 is referenced 4 times in the 36th line in the 1st section. In addition, in the program in FIG. 4, KAINBANGO is referenced once in the 40th line. Accordingly, the table (1) in FIG. 24 illustrates a result in which KUBUN1 is assigned with 4×2=8 points and KAINBANGO is assigned with 2 points.

In the program in FIG. 4, in the 2nd section, KUBUN1 is referenced 3 times in the 46th line to the 55th line, and WK-ERR is referenced once in the 58th line. Accordingly, the table (2) in FIG. 24 illustrates a result in which KUBUN1 is assigned with 3×2=6 points and WK-ERR is assigned with 2 points.

If the processing in FIG. 17 is performed based on FIG. 22 to FIG. 24, such a sort result as illustrated in, for example, FIG. 25 is obtained.

FIG. 25 illustrates an example of a result of sorting, in descending order, total values of respective per-section aggregate ranges. While the format of FIG. 25 is basically the same as that of FIG. 19, the 3rd field indicates a section name. The 4th field and fields subsequent thereto are the same as the 3rd field and fields subsequent thereto in FIG. 19.

In FIG. 25, the 1st line corresponds to the 2nd section, and the 2nd line corresponds to the 1st section. In other words, a result of determining that the 1st section is more complex is illustrated.

Note that FIG. 25 illustrates a sort result obtained in a case where the specified business operation information illustrated in FIG. 18 is not applied. If the relevant specified business operation information is applied, the 1st section is not included in a sort result. The reason is that HINMEI or a product name is not included in the 1st section.

Subsequently, a specific example of a processing result in a case where aggregate ranges are defined in units of conditional statements will be illustrated. Each of the following specific examples is based on the source code illustrated in FIG. 4.

FIG. 26 illustrates an example of point information related to the business operation factor amount (R1) in a per-conditional-statement aggregate range. While FIG. 4 includes 5 conditional statements, an item referenced in the IF statement in the 62nd line is not an input-output item. Accordingly, in FIG. 26, results in which 2 points are assigned to individual input-output items referenced in the 4 respective conditional statements are illustrated in respective tables (1) to (4).

In addition, FIG. 27 illustrates an example of point information related to the business operation determination multiplicity (R2) in a per-conditional-statement aggregate range. In FIG. 27, results in which points corresponding to the numbers of times input-output items are referenced in the 4 respective conditional statements are assigned to the respective input-output items referenced in the 4 conditional statements are illustrated in tables (1) to (4).

Note that since none of the conditional statements illustrated in FIG. 4 includes a computational expression located on the inside thereof, a point related to the business operation computational amount (R1-comp) is 0 point for each of the conditional statements.

If the processing in FIG. 17 is performed based on FIG. 26 and FIG. 27, such a sort result as illustrated in, for example, FIG. 28 is obtained.

FIG. 28 illustrates an example of a result of sorting, in descending order, total values of respective per-conditional-statement aggregate ranges. While the format of FIG. 28 is basically the same as that of FIG. 19, the 3rd field indicates a line number of a conditional statement, and the 4th field indicates whether the conditional statement is an IF statement or an EVALUATE statement. The fifth field and fields subsequent thereto are the same as the 3rd field and fields subsequent thereto in FIG. 19. In FIG. 28, the 5th line corresponds to the 5th conditional statement.

Note that in a case where the aggregate ranges are defined in units of sections or conditional statements, a scatter diagram, a software map, or the like may be created.

As described above, according to the present embodiment, items (input-output items) highly related to a business logic are identified in a program, and based on referenced states of input-output items in each of aggregate ranges, the individual aggregate ranges are prioritized. Accordingly, support of identifying an important part related to the business logic in the program is realized. As a result, a user is able to analyze, on a priority basis within a limited amount of time, a complex business logic difficult to understand and is able to efficiently understand software resources.

Note that the present embodiment may be applied to a program described in a language (for example, a C language, another programming language, or the like) other than COBOL. In this case, a section may be replaced with, for example, a function or the like.

Note that, in the present embodiment, the analysis device 10 is an example of an information processing device or a computer. The input-output item acquisition unit 11 is an example of an identification unit. Each of the point assignment unit 13 and the priority information setting unit 14 is an example of an assignment unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed by a computer, the method comprising:
    identifying, from among one or more items included in a source code of a program, an item that determines storing of data input to the program or outputting of data by the program;
    associating, with each of predetermined ranges of the source code, an index value, based on a number of the item referenced in a respective predetermined range of the source code for the storing of the data to the program or the outputting of the data by the program and a number of times the item is referenced in the respective predetermined range of the source code for the storing of the data to the program or the outputting of the data by the program; and
    outputting a result of the associating of the index value for each of the predetermined ranges,
    wherein the source code is configured by one or more of the predetermined ranges.

2. The method according to claim 1, wherein the item identified is a first item, and the method further comprises:
    identifying, based on a syntax applied to the source code, a second item that stores data input to the program or data output by the program; and
    identifying a third item that reaches the second item, by tracing an assignment relationship between items in the source code,
    wherein the second item and the third item are identified in the identifying of the first item.

3. The method according to claim 1, wherein
    in a map in which positions associated with the respective predetermined ranges are defined based on a relationship between the predetermined ranges, the outputting arranges, at the positions associated with the respective predetermined ranges, figures that have sizes corresponding to the index values associated with the respective predetermined ranges.

4. The method according to claim 1, wherein
    the outputting outputs an association result of the index value for a predetermined range that includes a predetermined character string and that is included in the one or more of the predetermined ranges.

5. The method according to claim 1, wherein the item identified is a first item, and
    the associating omits the first item included in a statement that is included in statements each including the first item in the source code and that is matched with a predetermined condition, from the number of the first items referenced in the corresponding predetermined range and the number of times the first item is referenced in the corresponding predetermined range.

6. The method according to claim 1, wherein
    the outputting includes:
        sorting the association result of the index value for each of the predetermined ranges based on the index values of the predetermined ranges, and
        displaying the sorted association result of the index value for each of the predetermined ranges.

7. A non-transitory storage medium storing a program for causing a computer to execute a process, the process comprising:
    identifying, from among one or more items included in a source code of a program, an item that determines storing of data input to the program or outputting of data by the program;
    associating, with each of predetermined ranges of the source code, an index value, based on a number of the item referenced in relevant respective predetermined range of the source code for the storing of the data to the program or the outputting of the data by the program and a number of times the item is referenced in the respective predetermined range of the source code for the storing of the data to the program or the outputting of the data by the program; and
    outputting a result of the associating of the index value for each of the predetermined ranges,
    wherein the source code is configured by one or more of the predetermined ranges.

8. The non-transitory storage medium according to claim 7, wherein the item identified is a first item, and the process further comprises:
    identifying, based on a syntax applied to the source code, a second item that stores data input to the program or data output by the program; and
    identifying a third item that reaches the second item, by tracing an assignment relationship between items in the source code,
    wherein the second item and the third item are identified in the identifying of the first item.

9. The non-transitory storage medium according to claim 7, wherein
    in a map in which positions associated with the respective predetermined ranges are defined based on a relationship between the predetermined ranges, the outputting arranges, at the positions associated with the respective predetermined ranges, figures that have sizes corresponding to the index values associated with the respective predetermined ranges.

10. The non-transitory storage medium according to claim 7, wherein
    the outputting outputs an association result of the index value for a predetermined range that includes a predetermined character string and that is included in the one or more of the predetermined ranges.

11. The non-transitory storage medium according to claim 7, wherein the item identified is a first item, and
the associating omits the first item included in a statement that is included in statements each including the first item in the source code and that is matched with a predetermined condition, from the number of the first items referenced in the corresponding predetermined range and the number of times the first item is referenced in the corresponding predetermined range.

12. The non-transitory storage medium according to claim 7, wherein the outputting includes:
sorting the association result of the index value for each of the predetermined ranges based on the index values of the predetermined ranges, and
displaying the sorted association result of the index value for each of the predetermined ranges.

13. An apparatus comprising:
a memory configured to store a source code of a program; and
a processor coupled to the memory and configured to:
identify, from among one or more items included in the source code, an item that determines storing of data input to the program or outputting of data by the program,
associate, with each of predetermined ranges of the source code, an index value, based on a number of the item referenced in relevant respective predetermined range of the source code for the storing of the data to the program or the outputting of the data by the program and a number of times the item is referenced in the respective predetermined range of the source code for the storing of the data to the program or the outputting of the data by the program, and
output a result of the index value associated with each of the predetermined ranges,
wherein the source code is configured by one or more of the predetermined ranges.

14. The apparatus according to claim 13, wherein the item identified is a first item, and the processor is configured to:
identify, based on a syntax applied to the source code, a second item that stores data input to the program or data output by the program,
identify a third item that reaches the second item, by tracing an assignment relationship between items in the source code, and
identify the second item and the third item when the first item is identified.

15. The apparatus according to claim 13, wherein
in a map in which positions associated with the respective predetermined ranges are defined based on a relationship between the predetermined ranges, the outputting arranges, at the positions associated with the respective predetermined ranges, figures that have sizes corresponding to the index values associated with the respective predetermined ranges.

16. The apparatus according to claim 13, wherein
the processor is configured to output an association result of the index value for a predetermined range that includes a predetermined character string and that is included in the one or more of the predetermined ranges.

17. The apparatus according to claim 13, wherein the item identified is a first item, and the processor is configured to:
omit the first item included in a statement that is included in statements each including the first item in the source code and that is matched with a predetermined condition, from the number of the first items referenced in the corresponding predetermined range and the number of times the first item is referenced in the corresponding predetermined range.

18. The apparatus according to claim 13, further comprising:
a display device, and
wherein the processor is configured to:
sort the association result of the index value for each of the predetermined ranges based on the index values of the predetermined ranges, and
display the sorted association result of the index value for each of the predetermined ranges on the display device.

* * * * *